United States Patent
Ito et al.

(10) Patent No.: US 8,705,561 B2
(45) Date of Patent: Apr. 22, 2014

(54) BROADCASTING METHOD AND RADIO APPARATUS

(75) Inventors: Kiyoshige Ito, Gifu (JP); Makoto Nagai, Kakamigahara (JP)

(73) Assignee: Sanyo Electric Co., Ltd., Osaka (JP)

(*) Notice: Subject to any disclaimer, the term of this patent is extended or adjusted under 35 U.S.C. 154(b) by 260 days.

(21) Appl. No.: 13/130,505

(22) PCT Filed: Nov. 20, 2009

(86) PCT No.: PCT/JP2009/006278
§ 371 (c)(1),
(2), (4) Date: Aug. 16, 2011

(87) PCT Pub. No.: WO2010/058598
PCT Pub. Date: May 27, 2010

(65) Prior Publication Data
US 2011/0299487 A1  Dec. 8, 2011

(30) Foreign Application Priority Data
Nov. 20, 2008  (JP) ................................ 2008-297150

(51) Int. Cl.
*H04L 12/413*  (2006.01)

(52) U.S. Cl.
USPC ............ 370/445; 370/319; 370/338; 370/344

(58) Field of Classification Search
USPC .......................... 370/329, 319, 338, 344, 445
See application file for complete search history.

(56) References Cited

U.S. PATENT DOCUMENTS

| 7,889,694 | B2 | 2/2011 | Ushiki et al. |
| 2009/0103501 | A1* | 4/2009 | Farrag et al. ................... 370/337 |
| 2009/0185489 | A1 | 7/2009 | Ruffini et al. |

FOREIGN PATENT DOCUMENTS

| JP | 2005-191659 A | 7/2005 |
| JP | 2005-202913 | 7/2005 |
| JP | 2006-033827 | 2/2006 |
| JP | 2006-295442 A | 10/2006 |
| JP | 2008-017317 A | 1/2008 |
| JP | 2008-060984 A | 3/2008 |
| JP | 2008-507881 A | 3/2008 |
| JP | 2008-131490 A | 6/2008 |
| JP | 2008-187300 A | 8/2008 |

OTHER PUBLICATIONS

International Preliminary Report on Patentability and Written Opinion of the International Searching Authority issued in International Patent Application No. PCT/JP2009/006278, mailed Jun. 30, 2011.

(Continued)

*Primary Examiner* — Omer S Mian
(74) *Attorney, Agent, or Firm* — McDermott Will & Emery LLP

(57) ABSTRACT

A processing unit sets the time interval before packet signals are broadcast, using a carrier sense multiple access (CSMA) scheme. A modem unit and an RF unit broadcasts the packet signals at the time intervals set by the processing unit. The RF unit and the modem unit receive a control signal broadcast from an access control apparatus at a predetermined frequency. The processing unit sets the time interval, during which the control signal is receivable, to a time length shorter than the time interval for the remaining cases.

5 Claims, 14 Drawing Sheets

(56) References Cited

OTHER PUBLICATIONS

Ohta, M., "PDMA (Packet Division Multiple Access) based Overlapping of Large and Small Cells Sharing a Channel", Technical Report of IEICE, 2005, pp. 119-122, The Institute of Electronics, Information and Communication Engineers, with English abstract.

Funabashi, T., "Hayawakari Koza", Nikkei Communications, Aug. 15, 2004, pp. 102-103, No. 420, with partial English translation.

Kuramoto. K., et al., "A real time ITS communication system for vehicle safety in intersections", IEICE Technical Report, 2006, pp. 35-39, The Institute of Electronics, Information and Communication Engineers, with English abstract.

Harada, T., et al., "Inter-Vehicle Communication System with Decentralized TDMA Protocol for Safety Driving", EPSJ SIG Technical Report, pp. 129-136, with English abstract.

Office Action issued in JP2008-297150 mailed Oct. 9, 2012.

Ohta, Masataka, "PDMA (Packet Division Multiple Access) based Overlapping of Large and Small Cells Sharing a Channel", Technical Report of IEICE, (Japan: The Institute of Electronics, Information and Communication Engineers, Jan. 20, 2005) vol. 104, No. 595, p. 119-122.

Funabashi, Tetsuya, "Expanding Use of Wireless LAN (9), QoS of wireless interval for better handling of voice and image," Nikkei Communicasions, (Japan: Nikkei Business Publications, Inc., Aug. 15, 2004), No. 420, p. 102-103.

Tadokoro, Yukihiro, "Decentralized TDMA Protocol with Transmission Period Control in Driving Support Systems for Safety," Technical Report in Information Processing Society of Japan, (Japan: Information Processing Society of Japan, Nov. 21, 2007), vol. 2007, No. 116, p. 121-128.

\* cited by examiner

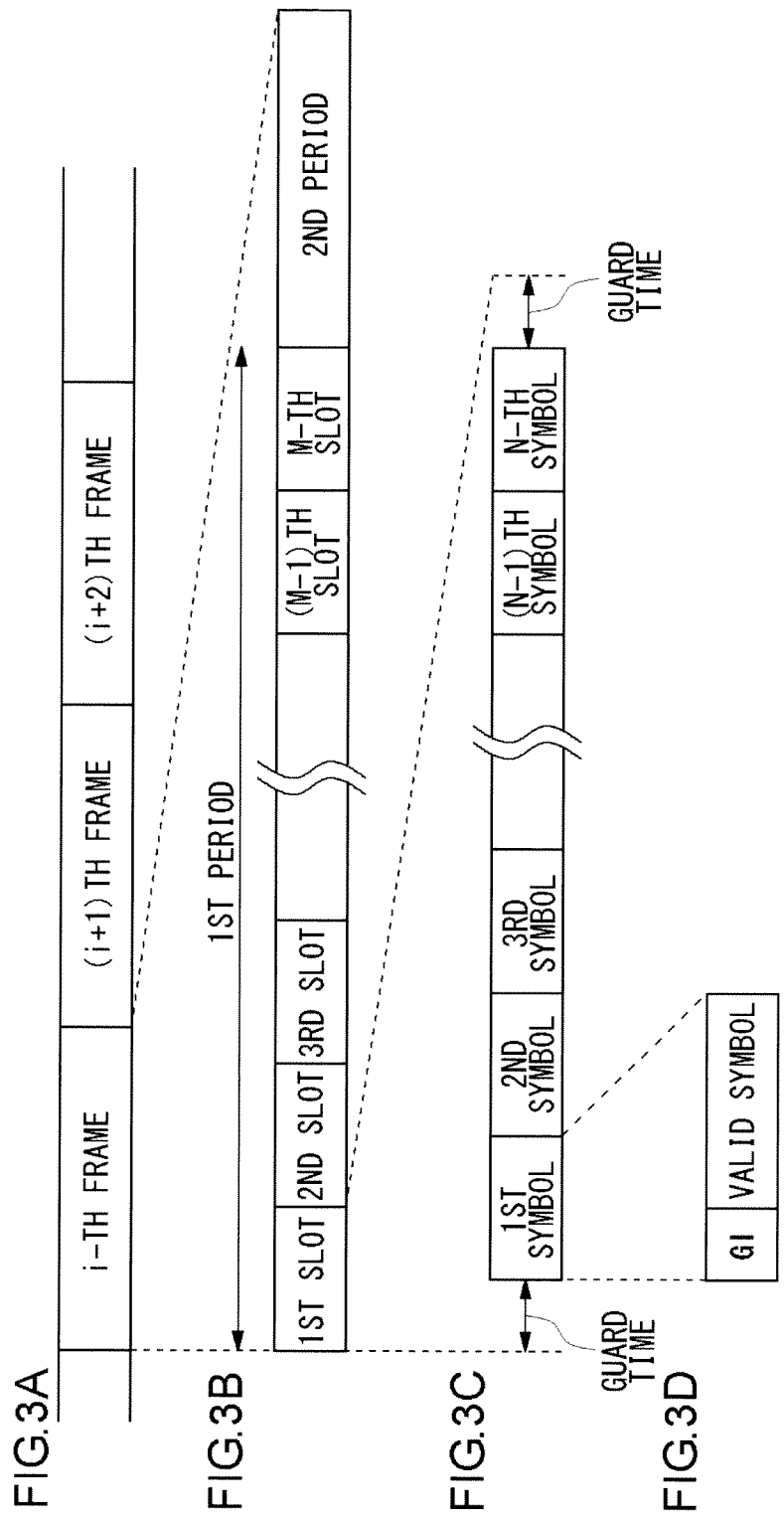

FIG.4A

| | | | | | | | | |
|---|---|---|---|---|---|---|---|---|
| 31 | N | N | N | -1 | D | D | D | |
| 30 | N | N | N | -2 | N | N | N | |
| 29 | N | N | N | -3 | D | D | D | |
| 28 | N | N | N | -4 | D | D | D | |
| 27 | N | N | N | -5 | D | D | D | |
| 26 | D | D | D | -6 | D | D | D | |
| 25 | D | D | D | -7 | P | P | P | |
| 24 | D | D | D | -8 | D | D | D | |
| 23 | D | D | D | -9 | D | D | D | |
| 22 | D | D | D | -10 | D | D | D | |
| 21 | P | P | P | -11 | D | D | D | |
| 20 | D | D | D | -12 | D | D | D | |
| 19 | D | D | D | -13 | D | D | D | |
| 18 | D | D | D | -14 | D | D | D | |
| 17 | D | D | D | -15 | D | D | D | |
| 16 | D | D | D | -16 | D | D | D | ... |
| 15 | D | D | D | -17 | D | D | D | |
| 14 | D | D | D | -18 | D | D | D | |
| 13 | D | D | D | -19 | D | D | D | |
| 12 | D | D | D | -20 | D | D | D | |
| 11 | D | D | D | -21 | P | P | P | |
| 10 | D | D | D | -22 | D | D | D | |
| 9 | D | D | D | -23 | D | D | D | |
| 8 | D | D | D | -24 | D | D | D | |
| 7 | P | P | P | -25 | D | D | D | |
| 6 | D | D | D | -26 | N | N | N | |
| 5 | D | D | D | -27 | N | N | N | |
| 4 | D | D | D | -28 | N | N | N | |
| 3 | D | D | D | -29 | N | N | N | |
| 2 | N | N | N | -30 | N | N | N | |
| 1 | D | D | D | -31 | N | N | N | |
| 0 | N | N | N | -32 | N | N | N | |

FIG.4B

| | | | | | | | | |
|---|---|---|---|---|---|---|---|---|
| 31 | N | N | N | -1 | N | N | N | |
| 30 | N | N | N | -2 | N | N | N | |
| 29 | N | N | N | -3 | D | D | D | |
| 28 | N | N | N | -4 | D | D | D | |
| 27 | N | N | N | -5 | D | D | D | |
| 26 | D | D | D | -6 | D | D | D | |
| 25 | D | D | D | -7 | P | P | P | |
| 24 | D | D | D | -8 | D | D | D | |
| 23 | D | D | D | -9 | D | D | D | |
| 22 | D | D | D | -10 | D | D | D | |
| 21 | P | P | P | -11 | D | D | D | |
| 20 | D | D | D | -12 | D | D | D | |
| 19 | D | D | D | -13 | D | D | D | |
| 18 | D | D | D | -14 | D | D | D | |
| 17 | D | D | D | -15 | D | D | D | |
| 16 | D | D | D | -16 | D | D | D | ... |
| 15 | D | D | D | -17 | D | D | D | |
| 14 | D | D | D | -18 | D | D | D | |
| 13 | D | D | D | -19 | D | D | D | |
| 12 | D | D | D | -20 | D | D | D | |
| 11 | D | D | D | -21 | P | P | P | |
| 10 | D | D | D | -22 | D | D | D | |
| 9 | D | D | D | -23 | D | D | D | |
| 8 | D | D | D | -24 | D | D | D | |
| 7 | P | P | P | -25 | D | D | D | |
| 6 | D | D | D | -26 | N | N | N | |
| 5 | D | D | D | -27 | N | N | N | |
| 4 | D | D | D | -28 | N | N | N | |
| 3 | D | D | D | -29 | N | N | N | |
| 2 | N | N | N | -30 | N | N | N | |
| 1 | N | N | N | -31 | N | N | N | |
| 0 | N | N | N | -32 | N | N | N | |

BROADCASTING METHOD AND RADIO APPARATUS

RELATED APPLICATIONS

This application is the U.S. National Phase under 35 U.S.C. §371 of International Application No. PCT/JP2009/006278, filed on Nov. 20, 2009, which in turn claims the benefit of Japanese Application No. 2008-297150, filed on Nov. 20, 2008, the disclosures of which Applications are incorporated by reference herein.

TECHNICAL FIELD

The present invention relates to an annunciation (broadcasting) technology and, more particularly, to a broadcasting method for sending signals containing predetermined information and an access control apparatus.

BACKGROUND TECHNOLOGY

Road-to-vehicle communication has been under investigation in an effort to prevent collision accidents of vehicles on a sudden encounter at an intersection. In a road-to-vehicle communication, information on conditions at an intersection is communicated between a roadside unit and an in-vehicle unit. Such a road-to-vehicle communication requires installation of roadside units, which means a great cost of time and money. In contrast to this, a vehicle-to-vehicle (inter-vehicular) communication, in which information is communicated between in-vehicle units, has no need for installation of roadside units. In that case, current position information is detected in real time by GPS (Global Positioning System) or the like and the position information is exchanged between the in-vehicle units. Thus it is determined on which of the roads leading to the intersection the driver's vehicle and the other vehicles are located (See Patent Document 1, for instance).

PRIOR ART DOCUMENTS

Patent Documents

[Patent Document 1] Japanese Unexamined Patent Application Publication No. 2005-202913.

Used in wireless LANs (Local Area Networks) conforming to standards, such as IEEE 802.11, is an access control function called Carrier Sense Multiple Access with Collision Avoidance (CSMA/CA). In such a wireless LAN, therefore, the same wireless channel is shared by a plurality of terminal apparatuses. Such CSMA/CA is subject to conditions involving mutual wireless signals not reaching the targets, namely, carrier sense not functioning, due to the effects of distance between the terminal apparatuses or obstacles attenuating the radio waves and so forth. When the carrier sense does not function, there occur collisions of packet signals transmitted from a plurality of terminal apparatuses. Also, wireless LANs employ the OFDM modulation scheme to achieve faster communication speed.

On the other hand, when a wireless LAN is applied to the inter-vehicular communication, a need arises to transmit information to a large indefinite number of terminal apparatuses, and therefore it is desirable that signals be sent by broadcast. Yet, at an intersection or like places, an increase in the number of vehicles, that is, the number of terminal apparatuses, is considered to cause an increase in the collisions of the packet signals therefrom. In consequence, data contained in the packet signals may not be transmitted to the other terminal apparatuses. If such a condition occurs in the inter-vehicular communication, then the objective of preventing collision accidents of vehicles on a sudden encounter at an intersection will not be attained.

The present invention has been made in view of the foregoing circumstances, and a purpose thereof is to provide a technology for reducing the collision probability of packet signals under conditions of increased volume of communication.

Means for Solving the Problems

In order to resolve the above problems, a radio apparatus according to one embodiment of the present invention includes: a control unit configured to set a time interval before a packet signal is broadcast, using a carrier sense multiple access (CSMA) scheme; and a communication unit configured to broadcast the packet signal at the time intervals set by the control unit. The communication unit may receive a control signal broadcast from an access control apparatus at a predetermined frequency, the access control apparatus controlling communications between radio apparatuses, and the control unit may sets a time interval, during which the control signal is receivable by the communication unit, to a time length shorter than the time interval for the remaining cases.

Another embodiment of the present invention relates also to a radio apparatus. The apparatus includes: a detecting unit configured to detect a slot, which is usable for the communications between a plurality of other terminal apparatuses, from among a plurality of slots in a first period of a frame containing the first period and a second period, wherein it is specified in a manner such that the frame containing the first period formed by the plurality of slots and the second period having a predetermined length is repeated; and a broadcasting unit configured to broadcast information on the slot detected by the detecting unit. In the second period in the detecting unit, a carrier sense multiple access (CSMA) scheme may be used by the plurality of other radio apparatuses, the broadcasting unit may further broadcast a parameter used to derive a time interval before a transmission using the CSMA scheme, and the time interval derived by the parameter being broadcast may be set to a time length shorter than the time interval derived by the parameter stored beforehand in the plurality of other radio apparatuses.

Still another embodiment of the present invention relates to a broadcasting method. The method includes: setting a time interval before a packet signal is broadcast, using a carrier sense multiple access (CSMA) scheme; and broadcasting the packet signal at the time intervals set by the setting. The setting is such that a time interval, during which a control signal broadcast from an access apparatus at a predetermined frequency is receivable, to a time length shorter than the time interval for the remaining cases, wherein the access control apparatus controls communications between radio apparatuses.

Still another embodiment of the present invention relates also to a broadcasting method. The method includes: detecting a slot, which is usable for the communications between a plurality of other terminal apparatuses, from among a plurality of slots in a first period of a frame containing the first period and a second period, wherein it is specified in a manner such that the frame containing the first period formed by the plurality of slots and the second period having a predetermined length is repeated; and broadcasting information on the detected slot. In the second period in the detecting, a carrier sense multiple access (CSMA) scheme may be used by the plurality of other radio apparatuses, the broadcasting may further broadcast a parameter used to derive a time interval before a transmission using the CSMA scheme, and the time interval derived by the parameter being broadcast may be set to a time length shorter than the time interval derived by the parameter stored beforehand in the plurality of other radio apparatuses.

Optional combinations of the aforementioned constituting elements, and implementations of the invention in the form of methods, apparatuses, systems, recording media, computer programs and so forth may also be practiced as additional modes of the present invention.

Effect of the Invention

The present invention reduces the collision probability of packet signals under conditions of increased volume of communication.

BRIEF DESCRIPTION OF THE DRAWINGS

FIGS. 3A to 3D show formats of frames specified by a frame specifying unit of FIG. 2.

FIGS. 4A and 4B show formats of OFDM symbol used in the communication system of FIG. 1.

BEST MODE FOR CARRYING OUT THE INVENTION

Figure 1:
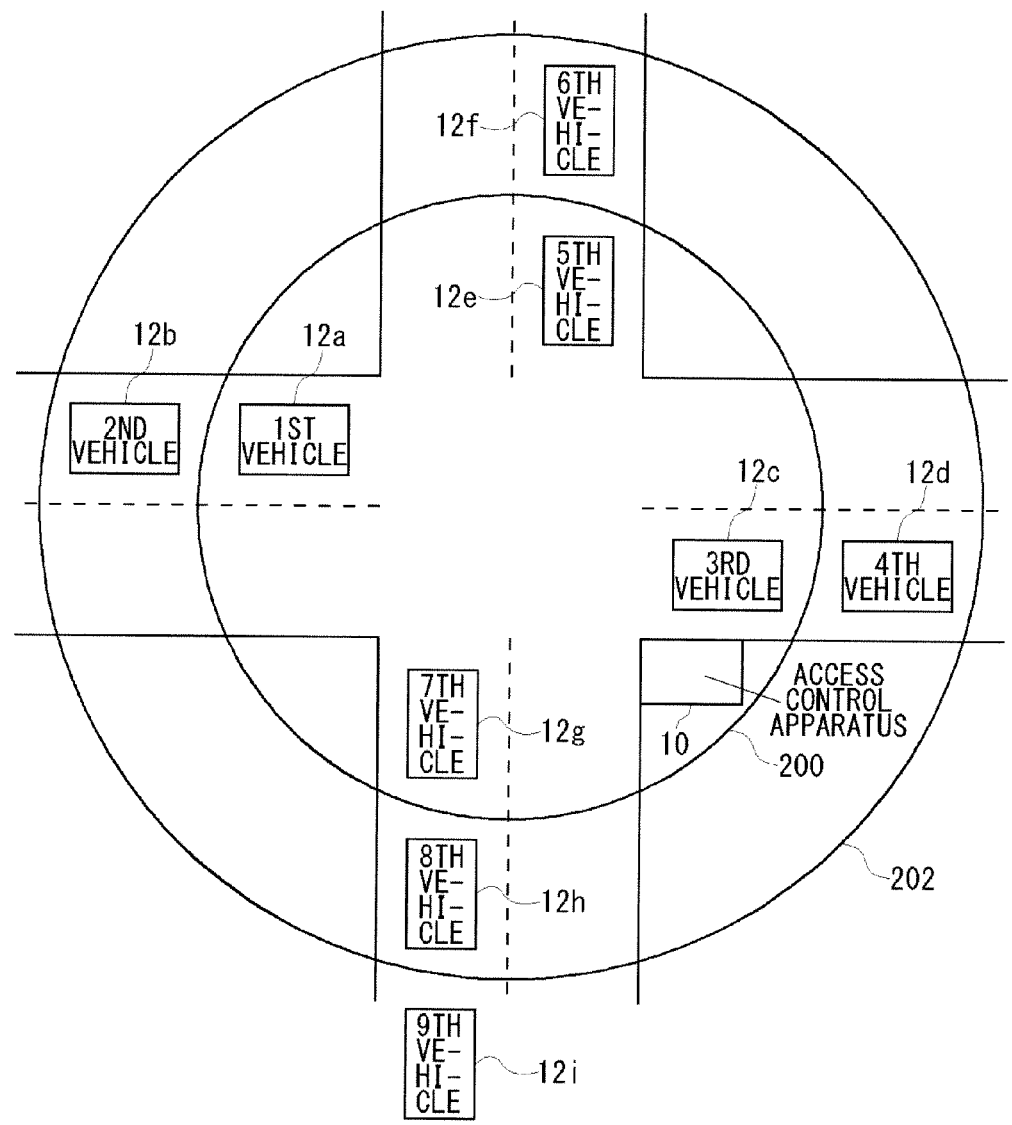
FIG. 1 shows a structure of a communication system according to an exemplary embodiment of the present invention.

The present invention will be outlined before it is explained in detail. Exemplary embodiments of the present invention relate to a communication system carrying out data communication between terminal apparatuses installed in vehicles. A terminal apparatus transmits, by broadcast, packet signals containing information such as the traveling speed and position of a vehicle (hereinafter referred to as "data"). And the other terminal apparatuses receive the packet signals and recognize the approach or the like of the vehicle based on the data. Note here that the terminal apparatuses employ the OFDM modulation scheme to achieve faster communication speed. Under these circumstances, an increase in the number of terminal apparatuses at an intersection or like place increases the probability of packet signals occurring. To cope with it, the communication system according to the present exemplary embodiment executes the following processes.

The communication system according to the present exemplary embodiment includes an access control apparatus in addition to a plurality of terminal apparatuses, and the access control apparatus is installed at an intersection, for instance. The access control apparatus repeatedly specifies a frame formed by a first period and a second period. Here, the first period contains a plurality of slots. The access control apparatus identifies slots not used in communication among a plurality of terminal terminals (hereinafter referred to as "empty slots" or "unused slots") by measuring the received power in each slot in the first period. Also, the access control apparatus adds information on frame construction and information on the identified slots to control information and transmits, by broadcast, a packet signal containing the control information (hereinafter referred to sometimes as "control information" also) using a single slot. It is to be understood here that the single slot is one determined beforehand. A terminal apparatus selects any of the empty slots based on the control information and transmits, by broadcast, a packet signal containing data (hereinafter referred to sometimes as "data" also) using the selected slot. Note that the terminal apparatus, when transmitting data over a plurality of frames, uses the same slots in corresponding timing in each frame.

The access control apparatus identifies slots having any collision (hereinafter referred to as "collision slots") by measuring in each slot for any collision of packet signals transmitted by a plurality of terminal apparatuses. The access control apparatus also adds information on the identified slots to the control information. A terminal apparatus checks for the presence of any collision in the already used slots, based on the control information. When there is any collision, the terminal apparatus selects any one of the other empty slots, based on the control information. Note here that the access control apparatus has no direct involvement in data communication between terminal apparatuses, that is, the access control apparatus does not directly specify the slot to be used in the data communication. In other words, the access control apparatus monitors the condition of data communication between terminal apparatuses and keeps broadcasting information on unused slots and collision slots.

It is to be noted that since the control information is also transmitted in a single slot, there are chances that the data transmitted from a terminal apparatus incapable of receiving the control information may collide with the control information. In consequence, if the other terminal apparatuses cannot receive the control information, then there arises a difficulty of carrying out the aforementioned processes. To cope with this situation, the OFDM signals used in transmitting data have some of the subcarriers as null carriers in which no data is contained (these subcarriers being hereinafter referred to as "identification carriers"). On the other hand, the OFDM signals used in transmitting control information have signals placed in the identification carriers, too. Hence, even when there is a collision between data and control information, the terminal apparatus can detect the presence of control information by observing the signal components of the identification carrier.

Also, as the number of terminal apparatuses is larger as compared with the number of slots contained in the first period, it is possible that the number of empty slots gets smaller and therefore the collision is more likely to occur. On the other hand, from the viewpoint of preventing the traffic accidences, it can be said that the data transmitted from a terminal apparatus located closer to the intersection is more important than the data transmitted from a terminal apparatus located far from the intersection. In view of the above points, the access control apparatus has the terminal apparatuses located closer to the terminal apparatus use the slots in the first period and has the terminal apparatus located far from the intersection perform CSMA/CA in the second period. As a result, the collision probability in the first period becomes lower than that in the second period and therefore the increase in the collision probability for important data is suppressed.

As described above, a terminal apparatus located far from the intersection (hereinafter referred to as "CSMA terminal apparatus") performs CSMA/CA using the second period. Note that a terminal apparatus that cannot receive the control information sent from the access control apparatus is a terminal apparatus located farther away from the intersection (hereinafter referred to as "unreachable terminal apparatus" or "outside-the-area terminal apparatus"). Such an unreachable terminal apparatus or outside-the-area apparatus located outside a given area performs CSMA/CA without regard to the second period. Accordingly, although both the CSMA terminal apparatus and the unreachable terminal apparatus are performing CSMA/CA, the transmission opportunity by the CSMA terminal apparatus is less than that by the unreachable terminal apparatus. In consequence, the throughput of the CSMA terminal apparatus may possibly become extremely low as compared with that of the unreachable terminal apparatus. Since the unreachable terminal apparatus transmits a packet signal regardless of frame constituents, this may interrupt not only the communication performed by the CSMA terminal apparatus but also the communication performed by the terminal apparatuses that transmit data using the first period. The communication system according to the present exemplary embodiment executes the following processes in order to reduce a deterioration in the throughput of the communication system even if such unreachable terminal apparatuses are present.

In CSMA performed by CSMA apparatuses and unreachable apparatuses, values for distributed inter-frame space (DIFS) and contention window (CW) are specified. Note that an inter-frame space (IFS) such as SIFS (Short Inter-Frame Space) or PIFS (Point coordination function Inter-Frame Space) may be used in place of DIFS but a description is given hereunder using DIFS for simplicity of explanation. Here, a CSMA terminal apparatus, which has detected a packet signal from an unreachable terminal apparatus in the first period, sets a "first DIFS" and a "first CW" as the DIFS value and the CW value, respectively. Here, the unreachable terminal apparatus also sets a "second DIFS" and a "second CW" as the DIFS value and the CW value, respectively, where it is defined that the "first DIFS" and the "first CW" differ from the "second DIFS" and the "second CW", respectively. In particular, it is defined that the values of the "first DIFS" and the "first CW" are smaller than those of the "second DIFS" and the "second CW", respectively.

The wait period before a transmission by the CSMA terminal apparatus tends to be shorter than the wait period before a transmission by the unreachable terminal apparatus. As a result, the former is more likely to transmit data preferentially than the latter using the second period and therefore the deterioration in the throughput of the CSMA terminal apparatus is suppressed. In such a case, the CSMA terminal apparatus conveys the second period to the unreachable terminal apparatus, thereby having the unreachable terminal apparatus transmit using the second period. As a result, the effect of the unreachable terminal apparatus on terminal apparatuses transmitting data using the first period is reduced.

FIG. 1 shows a structure of a communication system 100 according to an exemplary embodiment of the present invention. FIG. 1 corresponds to a case thereof at an intersection viewed from above. The communication system 100 includes an access control apparatus 10 and a first vehicle 12a, a second vehicle 12b, a third vehicle 12c, a fourth vehicle 12d, a fifth vehicle 12e, a sixth vehicle 12f, a seventh vehicle 12g, an eighth vehicle 12h, and a ninth vehicle 12i, which are generically referred to as "vehicle 12" or "vehicles 12". It is to be noted that each vehicle 12 has a not-shown terminal apparatus installed therein. Also, a first area 200 and a second area 202 are formed by the access control apparatus 10. The second area 202 is formed outside the first area 200, with the intersection as the center As shown in FIG. 1, a road extending in the horizontal, or left-right, direction and a road extending in the vertical, or up-down, direction in FIG. 1 intersect with each other in the central portion thereof. Note here that the upper side of FIG. 1 corresponds to the north, the left side thereof the west, the down side thereof the south, and the right side thereof the east. And the portion where the two roads intersect each other is the intersection. The first vehicle 12a and the second vehicle 12b are advancing from left to right, while the third vehicle 12c and the fourth vehicle 12d are advancing from right to left. Also, the fifth vehicle 12e and the sixth vehicle 12f are advancing downward, while the seventh vehicle 12g, the eighth vehicle 12h and the ninth vehicle 12i are advancing upward.

The terminal apparatus installed in each of the vehicles 12 acquires data and transmits, by broadcast, a packet signal containing the data. Here, before explaining exemplary embodiments of the present invention, a description will be given of an operation of a terminal apparatus which is compatible with a known wireless LAN, i.e., CSMA/CA. Each terminal apparatus transmits data by broadcast when it has determined by executing carrier sense that transmission is possible. Consequently, there are chances of data from a plurality of terminal apparatuses colliding with each other. Also, as the number of terminal apparatuses increases, there will be greater probability of collisions occurring. In particular, at locations like intersections, the likelihood of data collision is greater despite the fact that the likelihood of vehicles 12 colliding with each other is also great. This means failed utilization of data in spots where data is in the greatest demand.

Therefore, the communication system 100 places an access control apparatus 10 at each intersection. The access control apparatus 10 generates a frame repeatedly based on the signals received from not-shown GPS satellites. Here, each frame is formed by a first period and a second period wherein the first period contains a plurality of slots. Also, the access control apparatus 10 identifies empty slots and collision slots out of the plurality of slots. The method for identifying the empty slots and collision slots will be discussed later. The access control apparatus 10 adds information on the identified empty slots and collision slots to control information. Further, the access control apparatus 10 broadcasts the control information, using a predetermined slot. For example, the access control apparatus 10 broadcasts the control information, using the leading slot of each first period.

A plurality of terminal apparatuses existent in the first area 200 formed by the access control apparatus 10 receive the control information broadcast by the access control apparatus 10 and selects one of the empty slots. Also, each terminal apparatus broadcasts data, using a selected slot. Note here that the terminal apparatus broadcasts the data, using a slot corresponding to the selected slot for a plurality of frames.

For example, when a tenth slot from the top of the first period has been selected, it is the tenth slot from the top of the first period that must be used for the next frame also. It is to be noted that when there is an indication in control information that the slot being used is a collision slot, the terminal apparatus further selects another empty slot. The terminal apparatus repeats the above-described processing for the duration in which the terminal apparatus is located in the first area 200.

At the same time, a plurality of terminal apparatuses existent in the second area 202 formed by the access control apparatus 10 perform communications in the second period using CSMA/CA. Such terminal apparatuses correspond to the aforementioned CSMA apparatuses. A terminal apparatus decides on whether the communication shall be performed using the first period or the communication shall be performed using the second period, according to the received power of the control information sent from the access control apparatus 10. The terminal apparatus repeats the above-described processing for the duration in which the terminal apparatus can receive the control information broadcast by the access control apparatus 10. In other words, the terminal apparatus watches for the control information and detects its entry in the second area 202 when the terminal apparatus has received the control information. Also, the terminal apparatus detects its entry in the first area 200 when the received power of the control information becomes larger. The terminal apparatus which has received data from the other terminal apparatuses recognizes, based on the data, the presence of vehicles 12 that are carrying the other terminal apparatuses.

As with the ninth vehicle 12i, terminal apparatuses existent external to the second area 202 cannot receive the control information from the access control apparatus 10. Such terminal apparatuses correspond to the aforementioned unreachable terminal apparatuses. Accordingly, the unreachable terminal apparatus cannot recognize the timings of the first period and the second period. In this case, the unreachable terminal apparatus performs CSMA/CA in all of the periods. In CSMA/CA, the wait period before a transmission is controlled by DIFS and CW.

Note here that both the control information broadcast from the access control apparatus 10 and the data broadcast from the terminal apparatuses use OFDM signals. However, it is not the same subcarriers in which the control information and the data are placed. The data is not placed in the aforementioned identification carriers. On the other hand, identification information is placed not only in the subcarriers where the data is placed but also in the identification carriers. As a result, even when there is a collision between data and identification information, the terminal apparatus can detect the presence of control information by observing the signal components of identification carriers. It should be noted that the aforementioned detection of entry into the second area 202 by the terminal apparatus may be made relative to the identification carriers.

Figure 2:
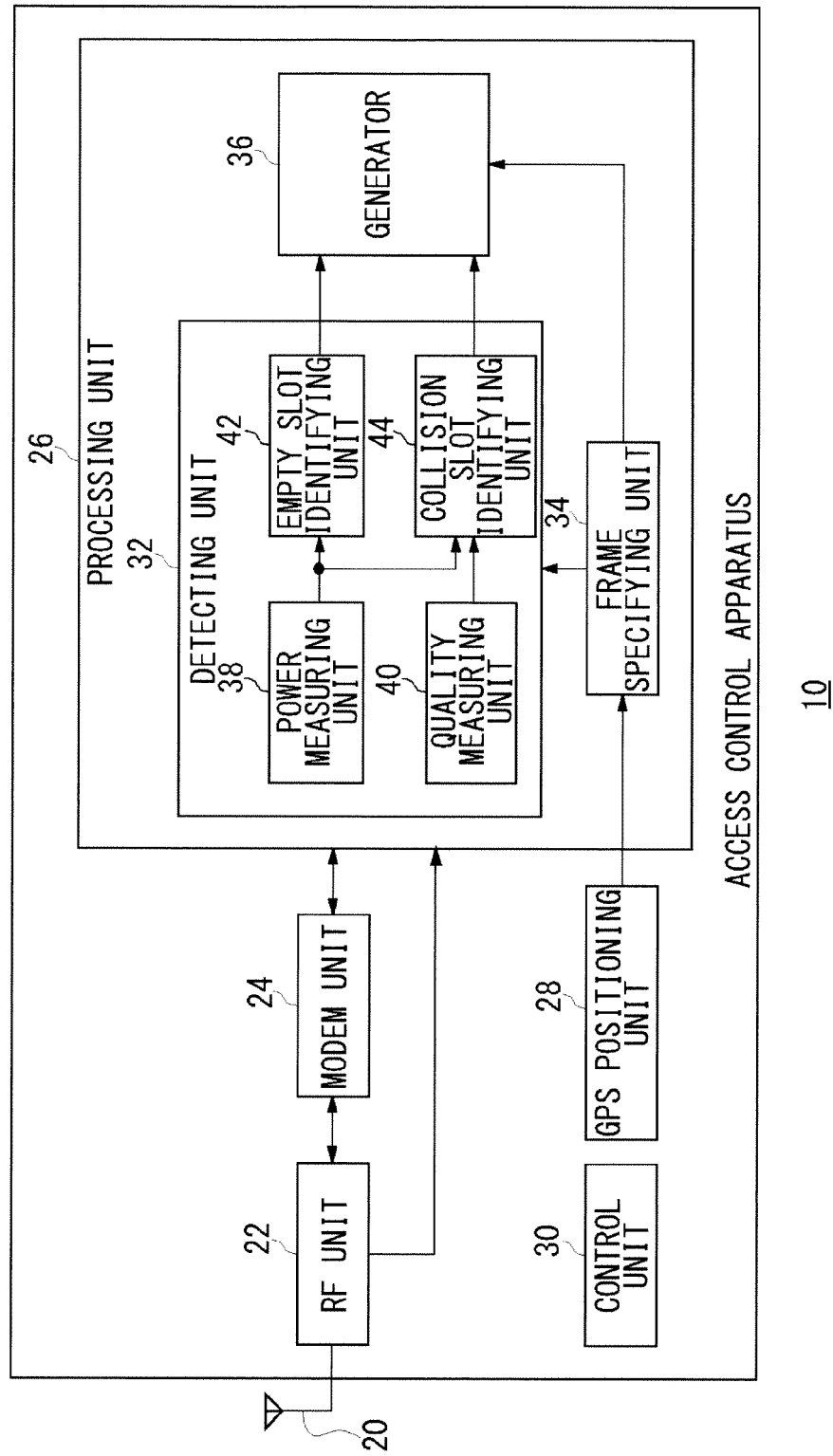
FIG. 2 shows a structure of an access control apparatus of FIG. 1.

FIG. 2 shows a structure of the access control apparatus 10. The access control apparatus 10 includes an antenna 20, an RF unit 22, a modem unit 24, a processing unit 26, a GPS positioning unit 28, and a control unit 30. The processing unit 26 includes a detecting unit 32, a frame specifying unit 34, and a generator 36. The detecting unit 32 includes a power measuring unit 38, a quality measuring unit 40, an empty slot identifying unit 42, and a collision slot identifying unit 44.

The GPS positioning unit 28 receives signals from not-shown GPS satellites and acquires information on the time of day based on the received signals. It should be noted that known art can be used for the acquisition of information on the time of day and therefore the description thereof is omitted here. The GPS positioning unit 28 outputs the information on the time of day to the frame specifying unit 34. The frame specifying unit 34 acquires information on the time of day from the GPS positioning unit 28. The frame specifying unit 34 generates a plurality of frames based on the information on the time of day. For example, the frame specifying unit 34 generates ten "100 msec" frames by dividing a duration of "1 sec" into 10 parts from the timing of "0 msec". Frames are thus defined and specified repeatedly through the repetition of this process.

Also, the frame specifying unit 34 divides each frame into the first period and the second period. A description will be given later of the lengths of first period and second period. The frame specifying unit 34 generates a plurality of slots by dividing the first period into a plurality of parts. For example, when the first period is "50 msec" long and each slot is "500 micro-sec" long, 100 slots are generated. In such a case, the second period is defined as a period having a predetermined length such as "50 msec". As previously indicated, since the communication system 100 employs the OFDM modulation scheme, each slot is so specified as to be composed of a plurality of OFDM symbols. Also, an OFDM symbol comprises a guard interval (GI) and a valid symbol. Note that a guard time may be provided in the front portion and the rear portion of each slot. It is to be noted also that a certain group of or combination of a plurality of OFDM symbols contained in a slot is equivalent to the packet signal mentioned earlier. It is to be noted here that during the second period, CSMA/CA is performed by a plurality of not-shown terminal apparatuses.

FIGS. 3A to 3D show the formats of frames specified by the frame specifying unit 34. FIG. 3A shows a structure of frames. As shown in FIG. 3A, a plurality of frames, such as i-th frame to (i+2)th frame, are so specified as to be repeated. Also, the duration of each frame is "100 msec", for instance. FIG. 3B shows a structure of a single frame. As shown in FIG. 3B, a single frame consists of a first period and a second period, and the first period consists of M units of slots. For example, the duration of each slot is "500 µsec". FIG. 3C shows a structure of a single slot. As shown in FIG. 3C, a guard time is provided in the front portion and the rear portion of each slot. And the remaining duration of the slot consists of N units of OFDM symbols. FIG. 3D shows a structure of each OFDM symbol. As shown in FIG. 3D, each OFDM symbol consists of a GI and a valid symbol. Let us now refer back to FIG. 2.

The RF unit 22 receives through the antenna 20 a packet signal transmitted in communication between the other terminal apparatuses (not shown) in each slot of the first period or the second period, as a receiving processing. The RF unit 22 performs a frequency conversion on the packet signal of a radiofrequency received through the antenna 20 and thereby generates a packet signal of baseband. Further, the RF unit 22 outputs the baseband packet signal to the modem unit 24. Generally, a baseband packet signal is formed of an in-phase component and a quadrature component, and therefore it should be represented by two signal lines. However, it is represented by a single signal line here to make the illustration clearer for understanding.

Also, the RF unit 22 includes an LNA (Low Noise Amplifier), a mixer, an AGC unit, and an A-D conversion unit. The RF unit 22 performs a frequency conversion on the baseband packet signal inputted from the modem unit 24 and thereby generates a radiofrequency packet signal in each slot of the first period or the second period as a transmission processing. Further, the RF unit 22 transmits, through the antenna 20, the radiofrequency packet signal. The RF unit 22 also includes a PA (Power Amplifier), a mixer, and a D-A conversion unit.

The modem unit 24 demodulates the radiofrequency packet signal fed from the RF unit 22, as a receiving processing. Further, the modem unit 24 outputs the demodulation result to the processing unit 26. Also, the modem unit 24 modulates the data fed from the processing unit 26, as a transmission processing. Further, the modem unit 24 outputs the modulation result to the RF unit 22 as a baseband packet signal. It is to be noted here that the communication system 100 is compatible with the OFDM modulation scheme and therefore the modem unit 24 performs FFT (Fast Fourier Transform) as a receiving processing and performs IFFT (Inverse Fast Fourier Tran7form) as a transmission processing also.

The power measuring unit 38 receives a received signal from the RF unit 22 or the modem unit 24 and measures the received power. The received power herein is measured slot by slot. Hence, the power measuring unit 38 measures the received power for each of the plurality of slots. The power measuring unit 38 outputs the received power for each slot to the empty slot identifying unit 42 and the collision slot identifying unit 44. The quality measuring unit 40 receives the demodulation result from the modem unit 24 and measures the signal quality for each of the plurality of slots. The signal quality measured herein is the error rate. It should be noted that known art can be used for the measurement of the error rate, so that the description thereof is omitted here. Also, instead of the error rate, EVM (Error Vector Magnitude) or the like may be measured as the signal quality. The quality measuring unit 40 outputs the error rate to the collision slot identifying unit 44.

The empty slot identifying unit 42 receives the received power for each slot from the power measuring unit 38. The empty slot identifying unit 42 compares each received power against a threshold value (hereinafter referred to as "threshold value for empty slot") and identifies the slot for which the received power is smaller than the threshold value for empty slot. That is, the empty slot identifying unit 42 detects, from among a plurality of slots in the first period of a frame containing the first period and the second period, a slot that can be used in communication between a plurality of terminal apparatuses, as an empty slot. Note here that when there are a plurality of empty slots, the empty slot identifying unit 42 identifies them as empty slots. The empty slot identifying unit 42 outputs information on the identified empty slots to the generator 36.

The collision slot identifying unit 44 receives the received power for each slot from the power measuring unit 38 and receives the error rate for each slot from the quality measuring unit 40. Also, the collision slot identifying unit 44 associates the received power with the error rate, slot by slot. The collision slot identifying unit 44 compares not only the received power against a first threshold value, but also the error rate against a second threshold value, slot by slot. The collision slot identifying unit 44 identifies, as a collision slot, a slot for which the received power is larger than the first threshold value and at the same time the error rate is higher than the second threshold value. That is, the collision slot identifying unit 44 recognizes, as a collision slot, a slot for which the received power is large but the communication quality is inferior. In this manner, the collision slot identifying unit 44 detects, as a collision slot, a slot in which a collision has occurred due to duplicate transmission of signals sent from a plurality of terminal apparatuses, from the plurality of slots in the first period of a frame containing the first period and the second period. The collision slot identifying unit 44 outputs information on the identified collision slots to the generator 36.

The generator 36 receives information on empty slots from the empty slot identifying unit 42 and also receives information on collision slots from the collision slot identifying unit 44. The generator 36 generates control information by adding the information on empty slots and the identification number of the access control apparatus 10. The generator 36 stores also a parameter used to derive a period before a transmission by CSMA/CA using the second period. For example, the parameter contains DIFS and CW. Here, DIFS is an interframe space (IFS) and indicates a period which is specified to determine if a channel is in an idle state or not.

CW is a value used to derive a backoff period. The backoff period is calculated by multiplying a random value by a given period of time. Here, the random value may be a random integer generated within a range of 0 to CW. The sum of DIFS and the backoff period corresponds to the period before a transmission by CSMA/CA. Here, DIFS stored in the generator 36 corresponds to a first DIFS, whereas CW stored in the generator 36 corresponds to a first CW. A not-shown terminal apparatus stores a second DIFS and a second CW in advance wherein the values of the first DIFS and the first CW are smaller than those of the second DIFS and the second CW, respectively.

Note here that the numbers, 1, 2, . . . from the start (hereinafter referred to as "slot numbers") are given respectively to a plurality of slots contained in a frame. The generator 36 adds the slot number(s) of the empty slot(s) contained in the previous frame(s) as information on empty slots to the control information. Also, the generator 36 adds the slot number(s) of the collision slot(s) contained in the previous frame(s) as information on collision slots to the control information. In addition thereto, the frame specifying unit 34 adds the first DIFS and the first CW (hereinafter generically referred to as "parameter") to the control information. Further, the generator 36 receives information on frames and slots from the frame specifying unit 34 and periodically assigns the control information to one slot contained in each first period. The generator 36 assigns the control information to the slot with slot number "1", or the leading slot of each frame, which is predetermined herein. The generator 36 outputs the control information to the modem unit 24, using the thus assigned slot.

As described above, the communication system 100 is compatible with the OFDM modulation scheme and therefore the generator 36 generates the control information as an OFDM signal. Note here that the OFDM signals are also used for the communications between a not-shown plurality of terminal apparatuses. A description is given herein by comparing an OFDM signal that has the control information assigned (hereinafter this is called "control information" also) with an OFDM signal that has data assigned (hereinafter this is called "data" also). FIGS. 4A and 4B illustrate formats of OFDM symbols used in the communication system 100. FIG. 4A corresponds to control information, whereas FIG. 4B corresponds to data.

In both FIG. 4A and FIG. 4B, the vertical direction represents the frequency, whereas the horizontal direction represents time. The numbers "31", "30", . . . , "−32" are indicated from top along the vertical direction, and these are the numbers assigned to identify subcarriers (hereinafter referred to as "subcarrier numbers"). In OFDM signals, the frequency of a subcarrier whose subcarrier number is "31" is the highest, whereas the frequency of a subcarrier whose subcarrier number is "−32" is the lowest. In FIG. 4A and FIG. 4B, "D" corresponds to a data symbol, "P" a pilot symbol, and "N" a null.

What are common to the control information and the data are the subcarrier numbers "31" to "27", "2", "0", and "−2", and the subcarrier numbers "−26" to "−32" which are all null. Of the control information, the subcarrier numbers "26" to "3", "−3" to "−25" are also used in data, and the use of symbols is the same for both the control information and the data. of the control information, on the other hand, the subcarrier numbers "1" and "−1" are not used for data. These correspond to the aforementioned identification carriers. That is, the identification carrier is assigned to a subcarrier near the center frequency of an OFDM signal. Of the control information, a guard band is provided between a subcarrier used also for data and the identification carrier, namely between the subcarrier number "2" and the subcarrier number "−2". The subcarriers of the subcarrier number "−2" through the subcarrier number "2" may be collectively called "identification carrier" or "identification carriers".

The generator 36 assigns the information on empty slots and the information on collision slots to subcarriers other than the identification carriers of the control information. Also, the generator 36 assigns the information on frames to the identification carrier. Also, the generator 36 may preferentially assign not only these items of information but also information having higher degrees of importance to the identification carrier. Examples of items of information contained in the control information are the latitude and longitude of an access control apparatus 10 and the identification number thereof. Also, a known signal is assigned to an OFDM symbol which is located anterior to the packet signal. Such a known signal is used for AGC or used to estimate the channel characteristics. The generator 36 may assign a known signal to the identification carrier over a partial period of a predetermined slot. Such a known signal is used as a unique word (UW), for example. Let us now refer back to FIG. 2.

The modem unit 24 and the RF unit 22 broadcast the control information generated in the generator 36 from the antenna 20. A terminal apparatus, which uses slots corresponding to the information on empty slots and information on the collision slots both contained in the control information, uses slots corresponding to said slots over a plurality of frames. For example, a slot whose slot number is "10" is used continuously. The control unit 30 controls the entire processing of the access control apparatus 10.

These structural components may be implemented hardwarewise by elements such as a CPU, memory and other LSIs of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

Figure 5:
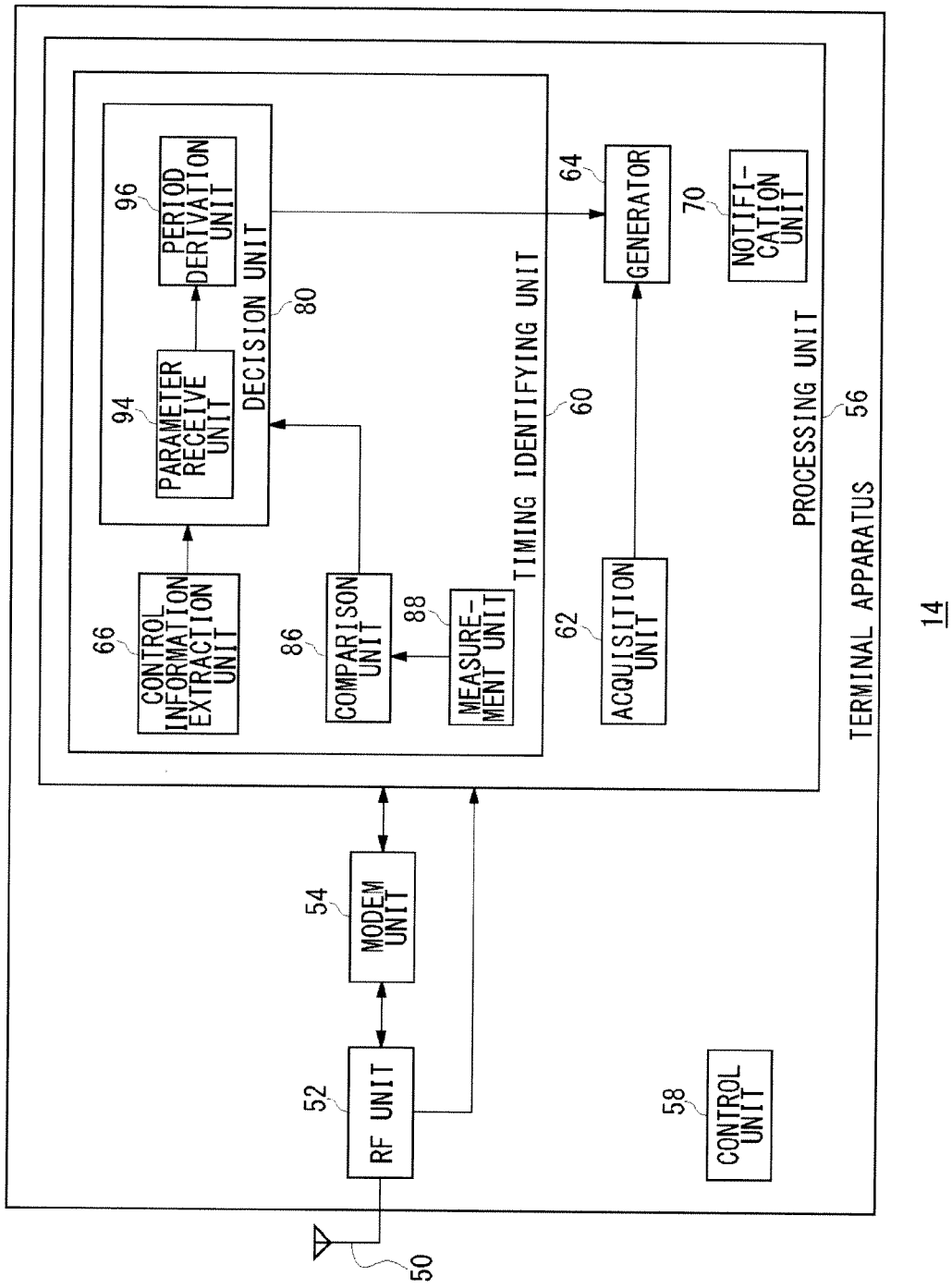
FIG. 5 shows a structure of a terminal apparatus mounted on a vehicle of FIG. 1.

FIG. 5 shows a structure of a terminal apparatus 14 mounted on a vehicle 12. The terminal apparatus 14 includes an antenna 50, an RF unit 52, a modem unit 54, a processing unit 56, and a control unit 58. The processing unit 56 includes a timing identifying unit 60, an acquisition unit 62, a generator 64, and a notification unit 70. The timing identifying unit 60 includes a control information extraction unit 66 and a decision unit 80, a comparison unit 86, and a measurement unit 88. The decision unit 80 includes a parameter receive unit 94 and a period derivation unit 96. The antenna 50, the RF unit 52 and the modem unit 54 carry out the processings similar to those carried out by the antenna 20, the RF unit 22 and the modem unit 24 of FIG. 2, respectively. Thus, the repeated description thereof is omitted here.

The acquisition unit 62 includes a GPS receiver, a gyroscope, a vehicle speed sensor, and so forth all of which are not shown in FIG. 5. The acquisition unit 62 acquires the present position, traveling direction, traveling speed and so forth of the vehicle 12, namely the vehicle 12 that are carrying the terminal apparatuses 14, based on data supplied from the aforementioned not-shown components of the acquisition unit 62. The present position thereof is indicated by the latitude and longitude. Known art may be employed to acquire them and therefore the description thereof is omitted here. The acquisition unit 62 outputs the thus acquired information to the generator 64.

The control information extraction unit 66 receives the demodulation result fed from the modem unit 54. Of the demodulation result, the control information extraction unit 66 monitors a part of subcarriers corresponding to the identification carrier. If valid data is contained in the part of subcarriers corresponding to the identification carrier, the control information extraction unit 66 will recognize that the control information extraction unit 66 is receiving a slot containing the control information therein. Also, the control information extraction unit 66 establishes the synchronization between frames and slots when the timing with which the slot containing the control information is received is used as a reference. As a result, the control information extraction unit 66 receives the control information broadcast from a not-shown access control apparatus 10 at a predetermined frequency.

Further, the control information extraction unit 66 acquires information on empty slots and information on collision slots, from the control information. The control information extraction unit 66 also acquires parameters and the identification number of a not-shown access control apparatus 10 from the control information. The control information extraction unit 66 outputs the information on empty slots and the information on collision slots to the decision unit 80, outputs the parameters to the parameter receive unit 94, and outputs the identification numbers to the generator 64 via the decision unit 80.

The measurement unit 88 receives a received signal of the control information from the RF unit 52 or the modem unit 54 and then measures the received power. The measurement unit 88 outputs the received power to the comparison unit 86. The comparison unit 86 receives the received power from the measurement unit 88, and stores the area determining threshold value beforehand. The comparison unit 86 compares the received power against the area determining threshold value. If the received power is larger than the area determining threshold value, the comparison unit 86 will determine the use of the first period. If, on the other hand, the received power is not larger than the area determining threshold value, the comparison unit 86 will determine the use of the second period. The comparison unit 86 outputs the thus determined content to the decision unit 80.

The decision unit 80 receives the content determined by the comparison unit 86 from the comparison unit 86. Also, the decision unit 80 receives information on empty slots and information on collision slots from the control information extraction unit 66. The decision unit 80 first ascertains whether the first period is to be used or the second period is to be used, based on the information from the comparison unit 86. When the information sent from the comparison unit 86 is not being received, namely when the control information is not being received, the decision unit 80 determines the execution of CSMA/CA (hereinafter referred to as "outside-the-area operation"). A description is given here in the order of (1)

a case where the first period is used, (2) a case where the second period is used, and (3) a case where the outside-the-area operation is performed.

(1) Case where the First Period is Used

The decision unit 80 selects one empty slot, based on the information on empty slots. Note that one empty slot may be selected arbitrarily. The decision unit 80 outputs the information on the selected empty slot to the generator 64. The generator 64 receives the information fed from the acquisition unit 62. The generator 64 generates data, based on said information wherein the data is formed as shown in FIG. 4B. Also, the generator 64 receives an instruction on the empty slot from the decision unit 80 and outputs the data to the modem unit 54 using the empty slot associated with the instruction. Note that the processing unit 56 may conduct carrier sensing before the data is outputted. For a first period of the next frame, too, the generator 64 outputs the data using the slot of the same slot number. In such a case, the generator 64 may add the identification number contained in the received information to the data.

While such processing continues, the control information extraction unit 66 continues to extract the information on empty slots and the information on collision slots, from the control information, frame by frame. The decision unit 80 checks to see if any of the slot numbers corresponding to the slots in current use is mistakenly taken as a collision slot. If no slot is taken mistakenly as a collision slot, the decision unit 80 will continue to output the same slot numbers as before to the generator 64. If, on the other hand, any slot is mistakenly taken as a collision slot, the decision unit 80 will select again an empty slot based on the information on empty slots. In other words, another slot, which is different from the slot selected before, is now selected. The decision unit 80 outputs the information on the selected empty slot to the generator 64. From then onward, the generator 64 carries out the processing similar to that described above.

(2) Case where the Second Period is Used

The second period is now explained. The parameter receive unit 94 receives the parameter from the control information extraction unit 66. The parameter receive unit 94 outputs the parameter to the period derivation unit 96. The period derivation unit 96, which stores the second DIFS and the second CW beforehand, derives a wait period before the transmission of a packet signal, based on the second DIFS and the second CW. Known art may be used to derive the wait period and therefore the description thereof is omitted here. When the parameter is received from the parameter receive unit 94, the period derivation unit 96 derives the wait period before the transmission of a packet signal, based on the first DIFS and the first CW associated with the parameter. The wait period before the transmission of a packet signal is identified by DIFS and the backoff period but the detailed description thereof is omitted here.

Here, the period derivation unit 96 preferentially uses the first DIFS and the first CW if the control information is receivable, and the period derivation unit 96 uses the second DIFS and the second CW in the remaining cases. The first DIFS and the first CW is used when the second period is used. Also, the values of the first DIFS and the first CW are set to be smaller than those of the second DIFS and second CW, respectively. This corresponds to setting the wait period in the case where the control information is receivable to a value shorter than that in the remaining cases. The period derivation unit 96 outputs the thus derived period to the generation unit 64. In other words, the period derivation unit 96 sets the wait period before the transmission of a packet signal by CSMA, in the generator 64.

The processing unit 56 performs carrier sense in a second period. When the result of carrier sense indicates that data can be transmitted, the generator 64 outputs the data to the modem unit 54 in the period set by the period derivation unit 96. In this case, too, the generator 64 may add the identification number contained in the received control information to the data. As a result, the modem unit 54, the RF unit 52 and the antenna 50 broadcast the packet signal in the period set by the period derivation unit 96 over the second period during which CSMA is to be executed. The notification unit 70 acquires data sent from another terminal apparatus 14 (not shown), and informs a driver that another vehicle 12 (not shown) is approaching and so forth. The processing carried out by the notification unit 70 is not limited thereto.

Another processing that differs from the above-described processing may be carried out in the second period. For example, even though the second period is to be used, the period derivation unit 96 derives the wait period before the transmission of a packet signal by the use of the second DIF and the second CW, similarly to the case where the control information is not being received. Also, the processing unit 56 detects, in the second period, the receiving of packet signals, broadcast from other terminal apparatuses 14, which have failed to follow the information contained in the control information. Such the packet signals correspond to the packet signals sent from the above-described unreachable terminal apparatuses. Though an operation of such an unreachable terminal apparatus will be discussed later, the unreachable terminal is generally not aware of the frame construction.

Thus, the unreachable terminal apparatus conducts carrier sensing using the second DIFS and the second CW without regard to the first period, and transmits the packet signal. If the receiving timing of the packet signal deviates from the timing of a slot and/or if the identification number of the access control apparatus 10 is not contained in the received packet signal, the processing unit 56 will recognize that the source of the packet signal is an unreachable terminal apparatus. If a packet signal is received from an unreachable terminal apparatus, the processing unit 56 will notify the period derivation unit 96 accordingly.

If the notification has been received from the processing unit 56, the period derivation unit 96 derives the wait period before the transmission of a packet signal, based on the first DIFS and the first CW, similarly to the above explanation. Also, the generator 64, the modem unit 54, the RF unit 52 and the antenna 50 broadcast the packet signal in the period set by the period derivation unit 96 over the second period. In so doing, the generator 64 adds the information on frame construction to the packet signal. The information on frame construction includes, for instance, the relative start time and ending time of the first period to the present time and the relative start time and ending time of the second period. In other words, if the packet signal sent from the unreachable terminal apparatus has been detected, the generator 64 and the like switch the second DIFS and the second CW to the first DIFS and the first CW, respectively, and transmit a packet signal which is used to at least convey the second period to the unreachable terminal apparatus. Also, after transmitting the packet signal, the period derivation unit 96 sets the second DIFS and the second CW again.

Such an operation as described above is now explained using specific values as an example. If the second DIFS is 64 μsec, the second CW is 0 to 16 and the slot period is 8 μsec, the range of DIF period and random backoff period will be 64 to 192 μsec. If, on the other hand, it is specified such that the first DIFS is 16 μsec and the first CW is 0 to 5, the range of DIF period and random backoff period will be less than or equal to 56 μsec. Thus, the latter can transmit the packet signal earlier than the former and can convey the frame construction.

(3) Case where an Outside-the-Area Operation is Performed

A description is now given of a case where an outside-the-area operation is performed. If the control information extraction unit 66 cannot receive the control information over a predetermined period of time, the decision unit 80 will determine the execution of the outside-the-area operation. As described earlier, the period derivation unit 96 derives the wait period before the transmission of a packet signal, using the second DIFS and the second CW. The processing unit 56 conducts carrier sensing in the wait period before the transmission of a packet signal, and the generator 64, the modem unit 54, the RF unit 52 and the antenna 50 transmit the packet signal. If the information on frame construction is contained in the packet signal received via the antenna 50, the RF unit 52 and the modem unit 54, the decision unit 80 will extract the information. The decision unit 80 identifies the second period based on this information and controls the generator 64 and the like so that the transmit timing of packet signals be restricted to the second period. The control unit 58 controls the entire operation of the terminal apparatus 14.

Figure 6:
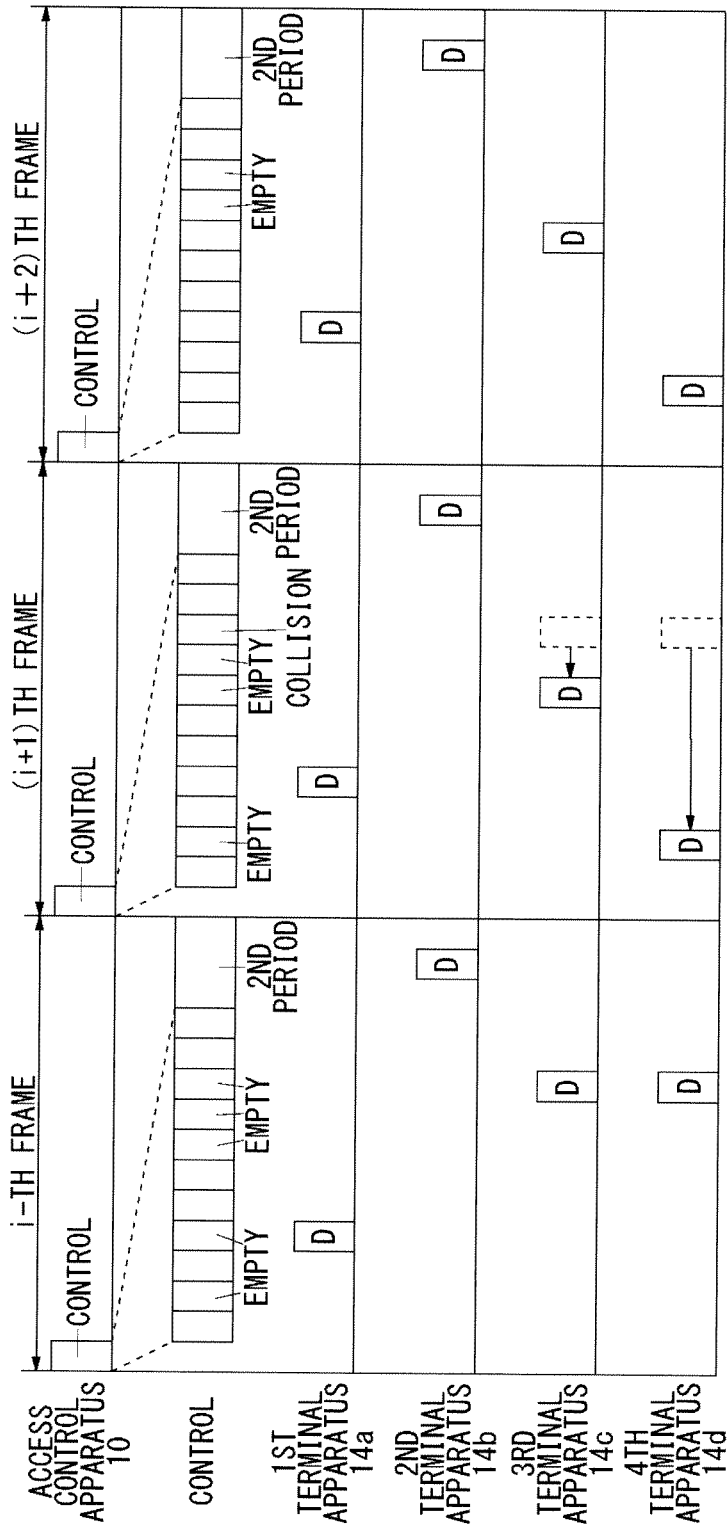
FIG. 6 shows an operational overview of the communication system of FIG. 1.

An operation of the communication system 100 configured as above is now described. FIG. 6 shows an operational overview of the communication system 100. Though the first terminal apparatus 14a to the fourth terminal apparatus 14d are shown in FIG. 6, it is assumed here that there is no relation between those terminal apparatuses 14a to 14d and the first vehicle 12a to the fourth vehicle 12d of FIG. 1. Also, the second terminal apparatus 14b is located in the second area 202 of FIG. 1. The horizontal direction of FIG. 6 corresponds to time, and three frames that are an ith frame to an (i+2)th frame are shown on the top row of FIG. 6. Assume herein for the clarity of description that each frame contains 12 slots and a second period. As shown in FIG. 6, the access control apparatus 10 broadcasts the control information using the leading slot of each frame. "Control" in FIG. 6 indicates control information. Below "control", information on empty slots and information on collision slots both contained in the control information are indicated by associating them with slots. "Empty" in FIG. 6 indicates an empty slot, whereas "collision" in FIG. 6 indicates a collision slot.

In the rows below the top row, the timings with which the first terminal apparatus 14a to the fourth terminal apparatus 14d broadcast the data are indicated. "D" in FIG. 6 means data. The first terminal apparatus 14a, the third terminal apparatus 14c and the fourth terminal apparatus 14d each references the control information and each selects an empty slot. The first terminal apparatus 14a, the third terminal apparatus 14c and the fourth terminal apparatus 14d each broadcasts the data using the selected empty slot in the ith frame. Since the empty slot selected by the third terminal apparatus 14c is identical to the empty slot selected by the fourth terminal apparatus 14d, the data broadcast from them collide with each other. The access control apparatus 10 detects the occurrence of collision in said slot. The control information, broadcast from the access control apparatus 10, in the (i+1)th frame indicates the slot where the collision occurs, as the information on the collision slot. At the same time, second terminal apparatus 14b broadcasts data in the second period, based on CSMA/CA.

Since no collision occurs in the slots which have already been used, the first terminal apparatus 14a uses again the slots having the same slot numbers. On the other hand, since collision has occurred in the slots which have already been used, the third terminal apparatus 14c and the fourth terminal apparatus 14d select another empty slots again. The third terminal apparatus 14c and the fourth terminal apparatus 14d broadcast data, using the selected empty slots. Since no collision occurs in all of data, no collision slot is indicated in the control information, broadcast from the access control apparatus 10, in the (i+2)th frame. Thus, the first terminal apparatus 14a, the third terminal apparatus 14c and the fourth terminal apparatus 14d use again the slots having the same slot numbers as the slots used already.

Figure 7:
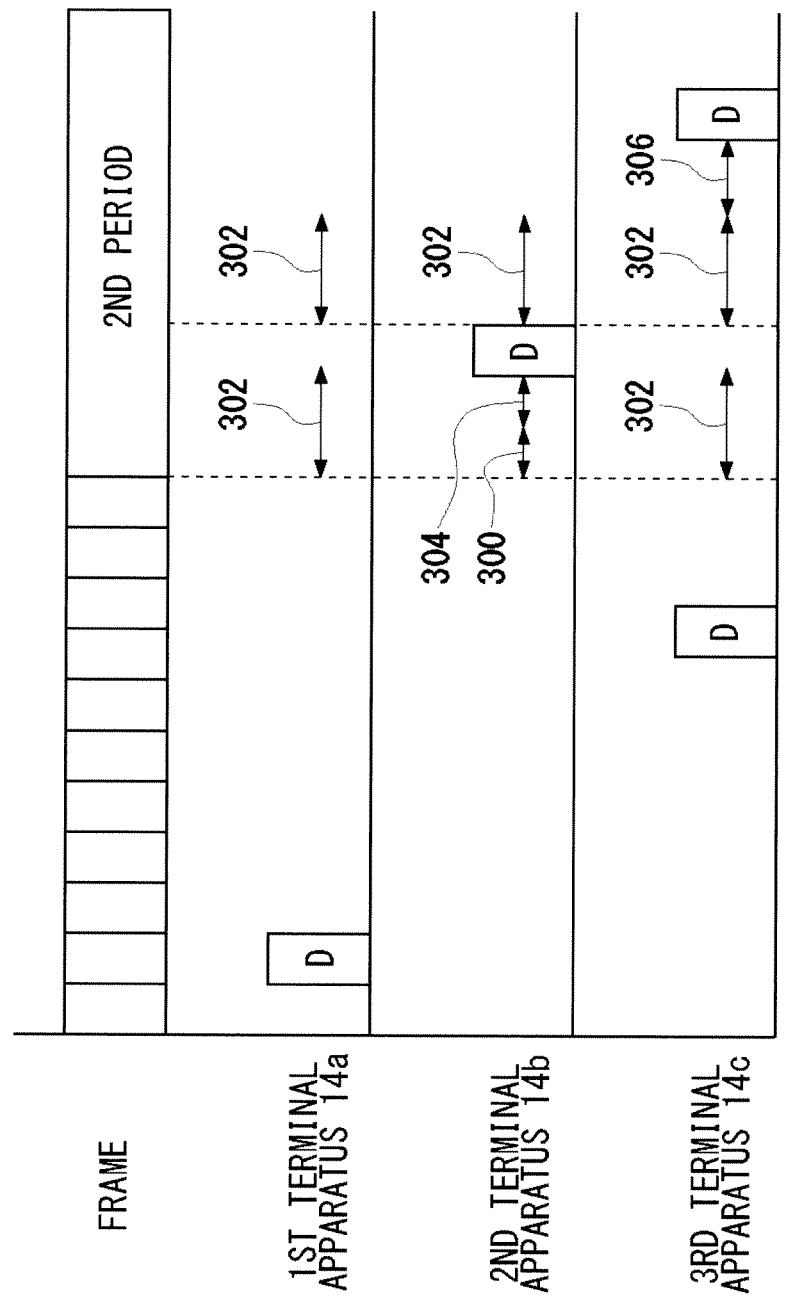
FIG. 7 shows another operational overview of the communication system of FIG. 1.

FIG. 7 is shows another operational overview of the communication system 100. FIG. 7 is illustrated in a similar manner to FIG. 6. A frame containing a first period composed of a plurality of slots and a second period are shown on the top row of FIG. 7. The control information is omitted in FIG. 7. On the row below the top row, the timing with which the first terminal apparatus 14a broadcasts data is shown. In this case, the first terminal apparatus 14a is a terminal apparatus that is to operate in the first period. On the row below this, the timing with which the second terminal apparatus 14b broadcasts data is shown. In this case, the second terminal apparatus 14b corresponds to the aforementioned CSMA terminal apparatus. On the bottom row, the timing with which the third terminal apparatus 14c broadcasts data is shown. In this case, the third terminal apparatus 14c is the aforementioned unreachable terminal apparatus.

The first terminal apparatus 14a transmits data using a predetermined slot. On the other hand, since the third terminal apparatus 14c is not aware of the frame construction, the third terminal apparatus 14c transmits data with the timings lying across a plurality of slots, without regard to the timings of slots. A second access control apparatus 10b receives the data sent from the third terminal apparatus 14c. When a not-shown terminal apparatus 14 transmits data using the last slot of the first period, second DIFS's 302 are set in the first terminal apparatus 14a and the third terminal apparatus 14c, starting from the start timing of the second period.

On the other hand, since the second terminal apparatus 14b receives the data sent from the third terminal apparatus 14c, a first DIF 300 and a backoff 304 are set. Then the second terminal apparatus 14b transmits the data. Since said data contains the information on frame construction and the present time, the third terminal apparatus 14c recognizes the timing with which the second period is assigned. Then the second DIF's 302 have elapsed in the first terminal apparatus 14a to the third terminal apparatus 14c. After this, the third terminal apparatus 14c waits until a backoff 306 and then transmits the data. Said data is transmitted in the second period.

Figure 8:
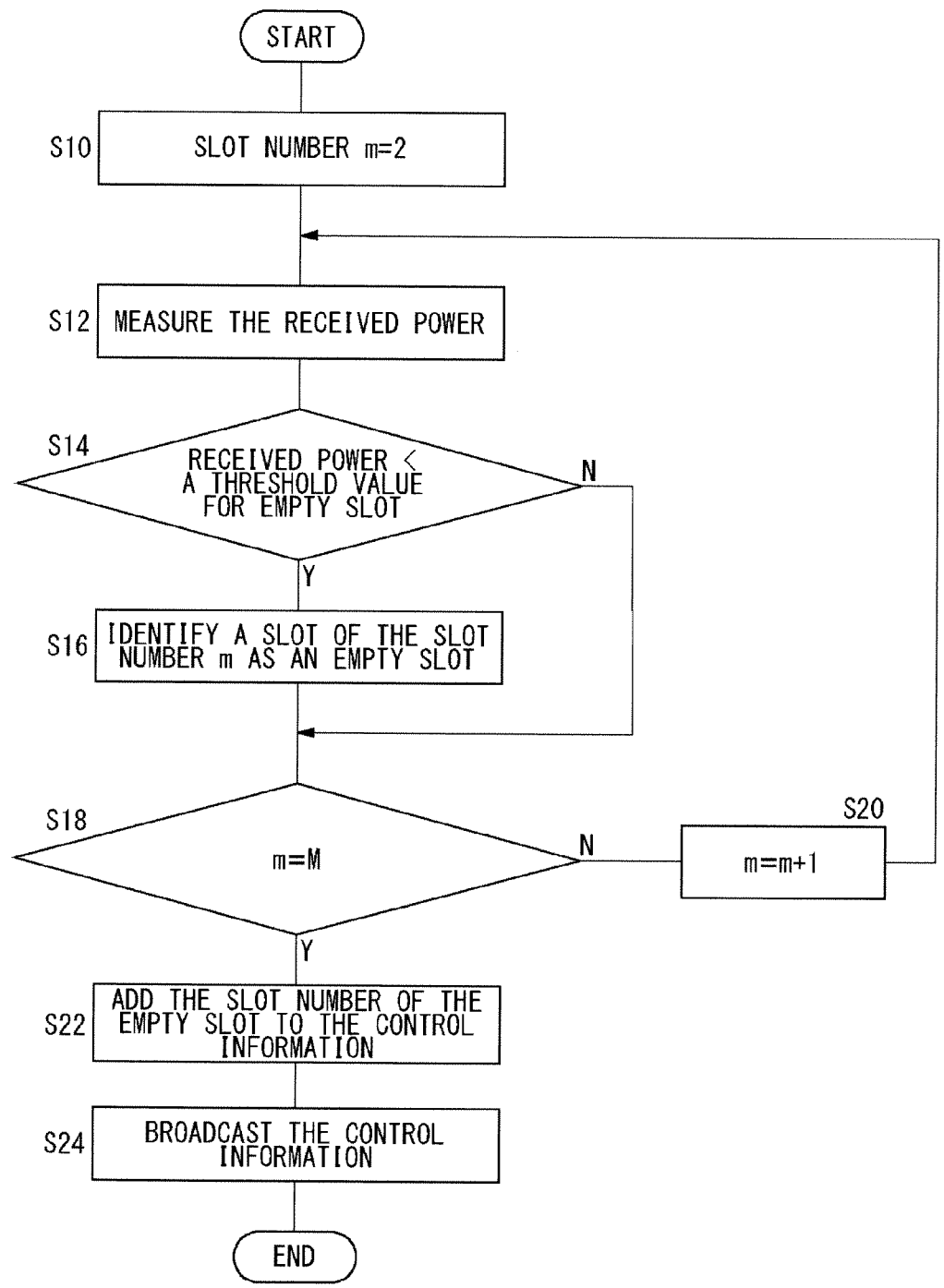
FIG. 8 is a flowchart showing a procedure in which the access control apparatus of FIG. 2 conveys an empty slot.

FIG. 8 is a flowchart showing a procedure in which the access control apparatus 10 conveys an empty slot. A description is given hereinbelow on the assumption that the slots belong to a first period of a frame. The detecting unit 32 sets the slot number m to "2" (S10). The power measuring unit 38 measures the received power (S12). If the received power is less than the threshold value for empty slot (Y of S14), the empty slot identifying unit 42 will identify the slot of the slot number m as an empty slot (S16). If the received power is not less than the threshold value for empty slot (N of S14), the empty slot identifying unit 42 will skip Step S16. If the slot number m is not equal to the maximum number M (N of S18), the detecting unit 32 will increment the slot number m by 1 (S20) and the process will return to Step S12. If, on the other hand, the slot number m is the maximum number M (Y of S18), the generator 36 will add the slot number of the empty slot to the control information (S22). The modem unit 24 and the RF unit 22 broadcast the control information (S24).

Figure 9:
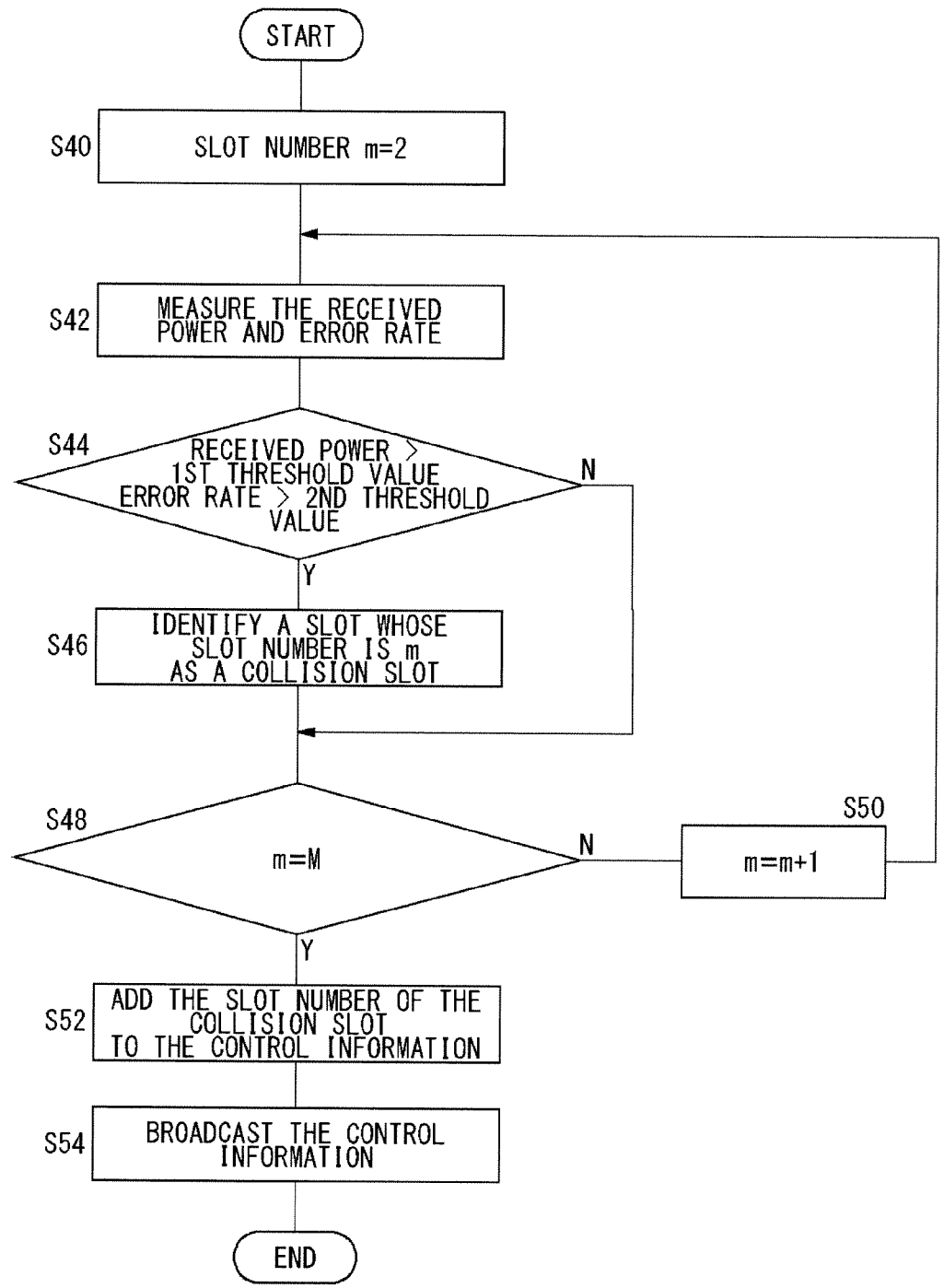
FIG. 9 is a flowchart showing a procedure in which the access control apparatus of FIG. 2 conveys a collision slot.

FIG. 9 is a flowchart showing a procedure in which the access control apparatus 10 conveys a collision slot. It is also assumed herein that the slots belong to a first period of a frame. The detecting unit 32 sets the slot number m to "2" (S40). The power measuring unit 38 measures the received power, and the quality measuring unit 40 measures the error rate (S42). If the received power is greater than the first threshold value and the error rate is greater than the second threshold value (Y of S44), the collision slot identifying unit 44 will identify the slot of the slot number m as a collision slot (S46). If the received power is not greater than the first threshold value or the error rate is not greater than the second threshold value (N of S44), the collision slot identifying unit 44 will skip Step S46. If the slot number m is not equal to the maximum number M (N of S48), the detecting unit 32 will increment the slot number m by 1 (S50) and the process will return to Step S42. If, on the other hand, the slot number m is the maximum number M (Y of S48), the generator 36 will add the slot number of the collision slot to the control information (S52). The modem unit 24 and the RF unit 22 broadcast the control information (S54).

Figure 10:
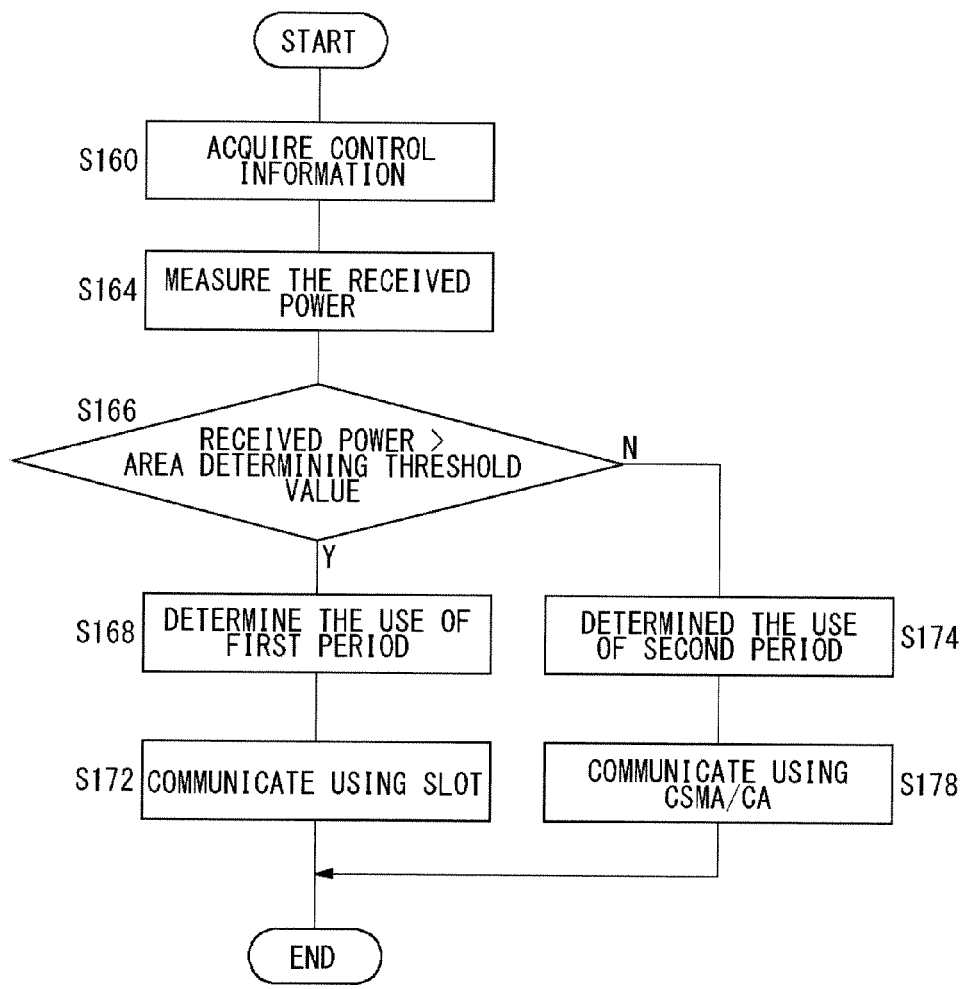
FIG. 10 is a flowchart showing a procedure in which the terminal apparatus of FIG. 5 determines a first period or a second period.

FIG. 10 is a flowchart showing a procedure in which the terminal apparatus 14 determines a first period or a second period. The control information extraction unit 66 acquires the control information (S160). The measurement unit 88 measures the received power (164). If the received power is larger than the area determining threshold value (Y of S166)), the comparison unit 86 will determine the use of first period (S168). The decision unit 80 performs communications using slots (S172). If the received power is not larger than the area determining threshold value (N of S166), the comparison unit 86 will determine the use of second period (3174). The decision unit 80 performs communications using CSMA/CA (S178). If, the control information is not acquired in Step S160, the decision unit 80 will determine the execution of the outside-the-area operation.

Figure 11:
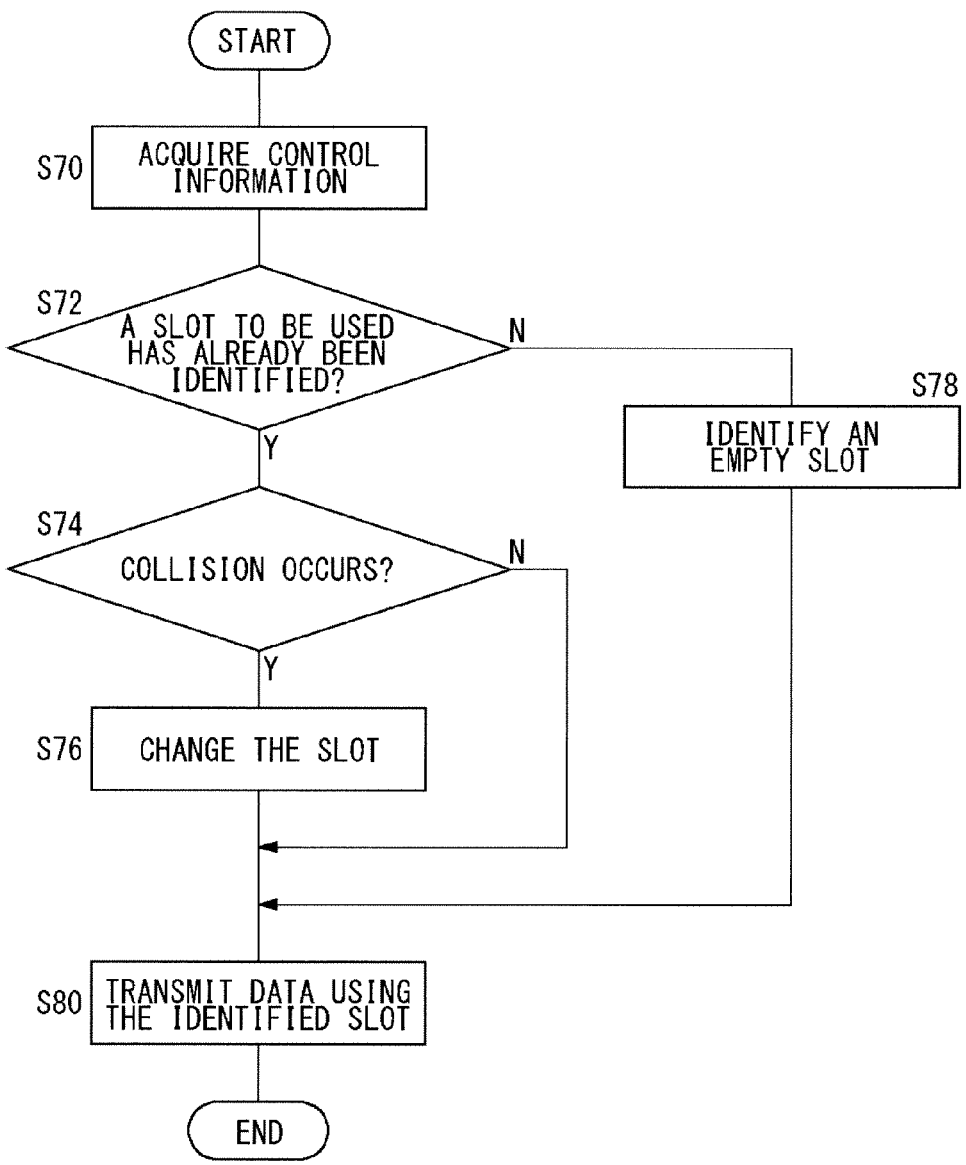
FIG. 11 is a flowchart showing a data transmission procedure performed by the terminal apparatus of FIG. 5.

FIG. 11 is a flowchart showing a data transmission procedure performed by the terminal apparatus 14. The control information extraction unit 66 acquires the control information (S70). If a slot to be used has already been identified (Y of S72), the decision unit 80 will verify whether collision occurs in this slot or not. If collision occurs (Y of S74), the decision unit 80 will change the slot (S76). If no collision occurs (N of S74), Step S76 will be skipped. If, on the other hand, a slot to be used has not already been identified (N of S72), the decision unit 80 will identify an empty slot (S78). The generator 64 transmits data, using the thus identified slot (S80).

Figure 12:
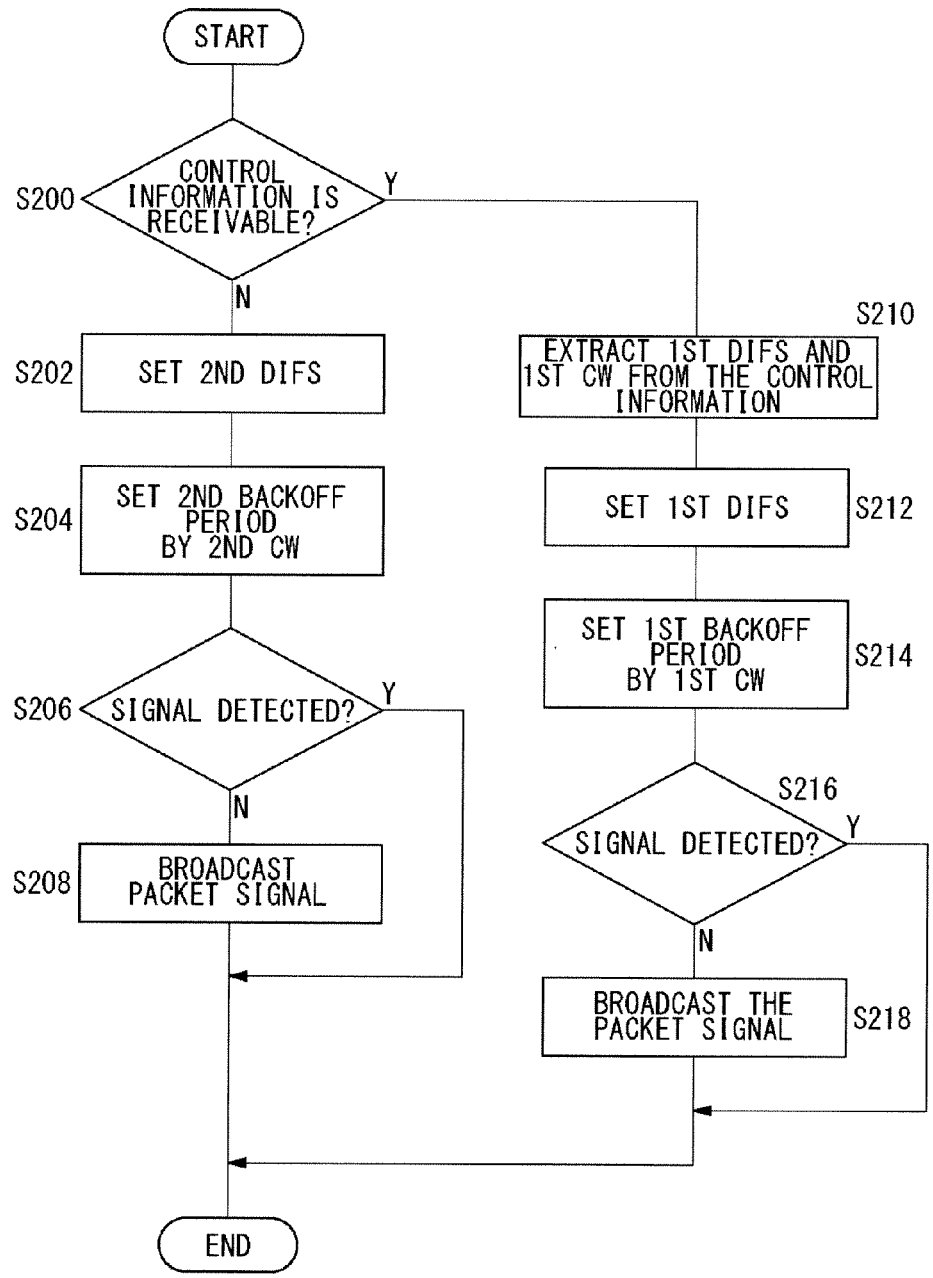
FIG. 12 is a flowchart showing another data transmission procedure performed by the terminal apparatus of FIG. 5.

FIG. 12 is a flowchart showing another data transmission procedure performed by the terminal apparatus 14. A description is given here of a case where either the execution using the second period or the execution of an outside-the-area operation is selected. If the control information extraction unit 66 is not capable of receiving the control information (N of S200), the decision unit 80 will set the second DIF period (S202). The decision unit 80 sets the backoff period by the second CW (S204). If the processing unit 56 does not detect any signal by carrier sensing (N of S206), the generator 64 and the like will broadcast packet signals (S208). If the processing unit 56 detects the signal by carrier sensing (Y of S206), Step S208 will be skipped.

If, on the other hand, the control information extraction unit 66 is capable of receiving the control information (Y of S200), the parameter receive unit 94 will extract the first DIFS and the first CW from the control information (S210). The decision unit 80 sets the first DIFS (S212). The decision unit 80 sets the first backoff period by the first CW (S214). If the processing unit 56 does not detect any signal by carrier sensing (N of S216), the generator 64 and the like will broadcast packet signals (S218). If the processing unit 56 detects the signal by carrier sensing (Y of S216), Step S218 will be skipped.

Figure 13:
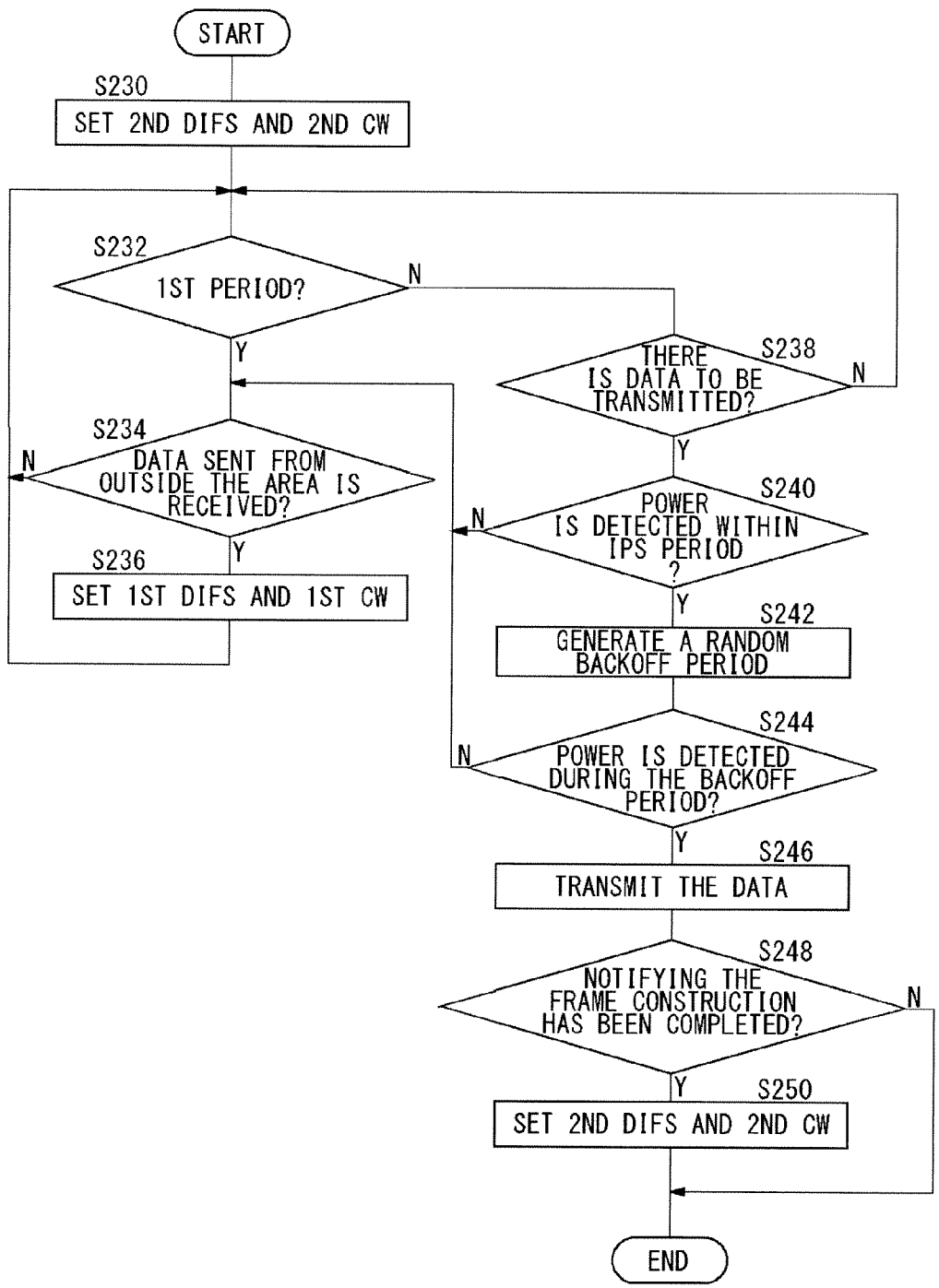
FIG. 13 is a flowchart showing still another data transmission procedure performed by the terminal apparatus of FIG. 5.

FIG. 13 is a flowchart showing still another data transmission procedure performed by the terminal apparatus 14. The decision unit 80 sets the second DIFS and the second CW (S230). If the period used is the first period (Y of S232) and if data sent from outside a designated area is received (Y of S234), the decision unit 80 will set the first DIFS and the first CW (S236) and then return to Step S232. If the data sent from outside the area is not received (N of S234), return to Step S232. If the period used is not the first period (N of S232) and if there is no data to be transmitted (N of S238), return to Step S232. If, on the other hand, there is data to be transmitted (Y of S238) and if the processing unit 56 does not detect the received power of data within an IPS period (N of S240), return to Step S234.

If the processing unit 56 detects the received power of data within the IPS period (Y of S240), the period derivation unit 96 will generate a random backoff period (S242). If the processing unit 56 does not detect the received power of data during the random backoff period (N of S244), return to Step S234. If the processing unit 56 detects the received power of data during the random backoff period (Y of S244), the generator 64 and the like will transmit the data (S246). If notifying a frame construction has been completed (Y of S248), the decision unit 80 will set the second DIFS and the second CW (S250). If notifying a frame construction has not been completed (N of S248), Step S250 will be skipped.

By employing the exemplary embodiment of the present invention, the time length before the broadcasting of the packet signal in a case where the control signal is receivable is set to a value smaller than that before the broadcasting of the packet signal in a case where the control signal is not receivable. Thus, the packets can be promptly transmitted when the control signal is receivable. Also, since the control information sent from the access apparatus contains the first DIFS and the first CW, the first DIFS and the first CW can be freely set. Also, since the packets can be promptly transmitted when the control signal is receivable, the transmission opportunity can be increased even though the transmission period is restricted. Since the time length elapsed until the packet signal is broadcast is shortened when the packet signal sent from the unreachable terminal apparatus is detected, the transmission opportunity of packet signals can be increased. Since the transmission opportunity of packet signals increases, the frame construction can be conveyed to the unreachable terminal apparatus.

Also, the slots usable in communication between a plurality of terminal apparatuses are detected from among a plurality of slots contained in a first period and the thus detected slots are broadcast. Thus, the probability of collisions occurring in communications between the plurality of terminal apparatuses is reduced. Since the probability of collisions in communications between the plurality of terminal apparatuses is reduced, the collision probability of packet signals under conditions of increased volume of communication can be reduced. Since empty slots are identified based on the respective received powers of the plurality of slots, the empty slots can be easily identified. Since the slot number of an empty slot which is contained in a previous frame is broadcast, the instructions to the terminal apparatuses can be executed reliably. Since a terminal apparatus, which is using the empty slot, uses a slot that corresponds to said slot, over a plurality of frames, the processing can be simplified. Also, the access control apparatus does not directly participate in the data communication between terminal apparatuses but only conveys a parameter related to the empty slots. Hence, the structure and operation according to the exemplary embodiments are easily applicable to a communication system premised on CSMA/CA, too.

Also, the slot in which a collision has occurred due to duplicate transmission of signals from the plurality of terminal apparatuses is broadcast from among a plurality of slots contained in a first period. Thus, the probability of collisions occurring in communications between the plurality of terminal apparatuses can be reduced. Also, the collision slots are identified based on the respective received powers of the plurality of slots and the respective signal qualities of the plurality of slots, so that the collision slots can be easily identified. Also, the slot number of a collision slot which is contained in a previous frame is broadcast, so that the instructions to the terminal apparatuses can be executed reliably. Also, the access control apparatus does not directly participate in the data communication between terminal apparatuses but only conveys a parameter related to the collision slots. Hence, the structure and operation according to the exemplary embodiments are easily applicable to a communication system premised on CSMA/CA, too.

Also, since each frame has a second period as well, a communication may be divided into one having a higher degree of importance and one having a lower degree of importance. Since the communication is divided into a communication of high importance and a communication of low importance, the increase in the collision probability for the communication of high importance is suppressed. Also, the length of first period is adjusted according to the number of terminal apparatuses, so that the first period and the second period can be used effectively. Also, the number of terminal apparatuses is estimated by the received power, so that the number of terminal apparatuses can be easily estimated even though a terminal apparatus is not in direct communication with another terminal apparatus.

Also, the information on a terminal apparatus which is to use a plurality of slots in the first period of a frame containing the first period and the second period is broadcast, so that a plurality of terminal apparatuses can be distributed between the first period and the second period. Since a plurality of terminal apparatuses are distributed between the first period and the second period, the collision probability of packet signals in the first period can be reduced. Also, the area determining threshold value is used as the information on a terminal apparatus which is to use a plurality of slots in the first period of a frame containing the first period and the second period, so that the value can be adjusted easily. Since the area determining threshold value is used, the use of first period or second period can be designated even if a terminal apparatus is not equipped with a measurement function.

Also, the identification carriers in the control information are not used for data, whereas the remaining subcarriers are also used for data. Thus, even if the control information and data signals collide, the presence of the control information can be detected by observing the signal components of the control information. Also, the guard band is provided between the identification carrier and the other subcarriers, so that the interference therebetween can be reduced and the probability of arrival of information transmitted using the identification carriers can be improved. Also, important information is assigned to the identification carrier, so that the probability of arrival of important information can be improved. Also, the UW is assigned to the identification carrier, so that the degree of accuracy in detecting the identification carriers can be improved.

The present invention has been described based on the exemplary embodiments. The exemplary embodiments are intended to be illustrative only, and it is understood by those skilled in the art that various modifications to constituting elements and processes as well as arbitrary combinations thereof could be further developed and that such modifications and combinations are also within the scope of the present invention.

In the exemplary embodiment of the present invention, the control information broadcast from the access control apparatus 10 and the data broadcast from a terminal apparatus 14 are each assigned to a single slot. However, this should not be considered as limiting and, for example, the control information and the data may each be assigned to two or more slots. According to this modification, the transmission rate of control information and data can be increased.

In the exemplary embodiment of the present invention, an identification carrier is equivalent to two subcarriers. Also, the identification carrier is assigned to the subcarriers near the center frequency of an OFDM symbol. However, this should not be considered as limiting and, for example, the identification carrier may be equivalent to more than two subcarriers. For example, the identification carrier may be assigned to subcarriers other than those near the center frequency of an OFDM symbol. According to this modification, the communication system 100 can be designed more freely.

DESCRIPTION OF THE REFERENCE NUMERALS

10 Access control apparatus
12 Vehicle
14 Terminal apparatus
20 Antenna
22 RF unit
24 Modem unit
26 Processing unit
28 GPS positioning unit
30 Control unit
32 Detecting unit
34 Frame specifying unit
36 Generator
38 Power measuring unit
40 Quality measuring unit
42 Empty slot identifying unit
44 Collision slot identifying unit
50 Antenna
52 RF unit
54 Modem unit
56 Processing unit
58 Control unit
60 Timing identifying unit
62 Acquisition unit
64 Generator
66 Control information extraction unit
70 Notification unit
80 Decision unit
86 Comparison unit
88 Measurement unit
94 Parameter receive unit
96 Period derivation unit
100 Communication system

INDUSTRIAL APPLICABILITY

The present invention reduces the collision probability of packet signals even when the communication volume has increased.

What is claimed is:

1. A radio apparatus, comprising:
a control unit configured to set a time interval before a packet signal is broadcast; and
a communication unit configured to broadcast the packet signal at the time interval set by said control unit, wherein
the communication unit receives a control signal broadcasted from an access control apparatus, the control signal including information regarding frame construction defining 100 milliseconds frames each including a first period and a second period, during the first period, a packet signal under an orthogonal frequency-division multiplexing (OFDM) scheme is broadcasted by the access control apparatus, during the second period, a packet signal under a carrier sense multiple access with collision avoidance (CSMA/CA) communication scheme is broadcasted by the radio apparatus, the control signal being broadcasted in the first period,
while the radio apparatus is in a location where no control signal is receivable by the communication unit, the control unit sets the time interval to be a first interval to broadcast the packet signal under the CSMA/CA communication scheme independently of the information regarding frame construction,
while the radio apparatus is in a location where the control signal is receivable in the first period by the communication unit, the control unit sets the time interval to a second interval shorter than the first interval to broadcast the packet signal under the CSMA/CA communication scheme in the second period,
the first period includes a plurality of first slots in which a packet signal under the OFDM scheme from the access control apparatus is broadcasted and a plurality of second slots in which a packet signal under the OFDM scheme from the radio apparatus is transmitted, the first and second slots being time-division multiplexed, and
the control signal received by said communication unit contains slot information on the plurality of second slots in the first period, the slot information being usable for communication between the radio apparatus and a second radio apparatus different from the radio apparatus, and the slot information comprising an indication on one or more collision slots if a collision is detected by the access control apparatus during the one or more collision slots among the plurality of second slots.

2. The radio apparatus according to claim 1, wherein said control unit stores, beforehand, a first parameter to set the time interval, and
when the control signal containing a second parameter to set the time interval is received by said communication unit, the second parameter contained in the control signal is used to set the time interval.

3. The radio apparatus according to claim 1, further comprising a detecting unit configured to detect a packet signal, broadcast from a plurality of radio apparatuses different from the radio apparatus and the second radio apparatus, which fails to comply with the slot information contained in the control signal, wherein
when the packet signal which fails to comply with the slot information is detected by said detecting unit, said communication unit transmits a packet signal used to inform the plurality of radio apparatuses of the second period.

4. The radio apparatus according to claim 2, wherein the second parameter included in the control signal received by the communication unit sets a shorter time interval than the time interval set by the first parameter stored beforehand in the control unit.

5. A broadcasting method, comprising:
setting a time interval before a packet signal is broadcast; and
broadcasting the packet signal at the time interval, wherein
a control signal is broadcasted from an access control apparatus, the control signal including information regarding frame construction defining 100 milliseconds frames each including a first period and a second period, during the first period, a packet signal under an orthogonal frequency-division multiplexing (OFDM) scheme is broadcasted by the access control apparatus, during the second period, a packet signal under a carrier sense multiple access with collision avoidance (CSMA/CA) communication scheme is broadcasted by a radio apparatus, the control signal being broadcasted in the first period,
while no control signal is receivable, setting the time interval to be a first interval to broadcast the packet signal under the CSMA/CA communication scheme independently of the information regarding frame construction,
while the control signal is receivable in the first period, setting the time interval to a second interval shorter than the first interval to broadcast the packet signal under the CSMA/CA communication scheme in the second period,
the first period includes a plurality of first slots in which a packet signal under the OFDM scheme from the access control apparatus is broadcasted and a plurality of second slots in which a packet signal under the OFDM scheme from the radio apparatus is transmitted, the first and second slots being time-division multiplexed, and
the control signal contains slot information on the plurality of second slots in the first period, the slot information being usable for communication between the radio apparatus and a second radio apparatus different than the radio apparatus, and the slot information comprising an indication on one or more collision slots if a collision is detected by the access control apparatus during the one or more collision slots among the plurality of second slots.

* * * * *